Patented Feb. 16, 1954

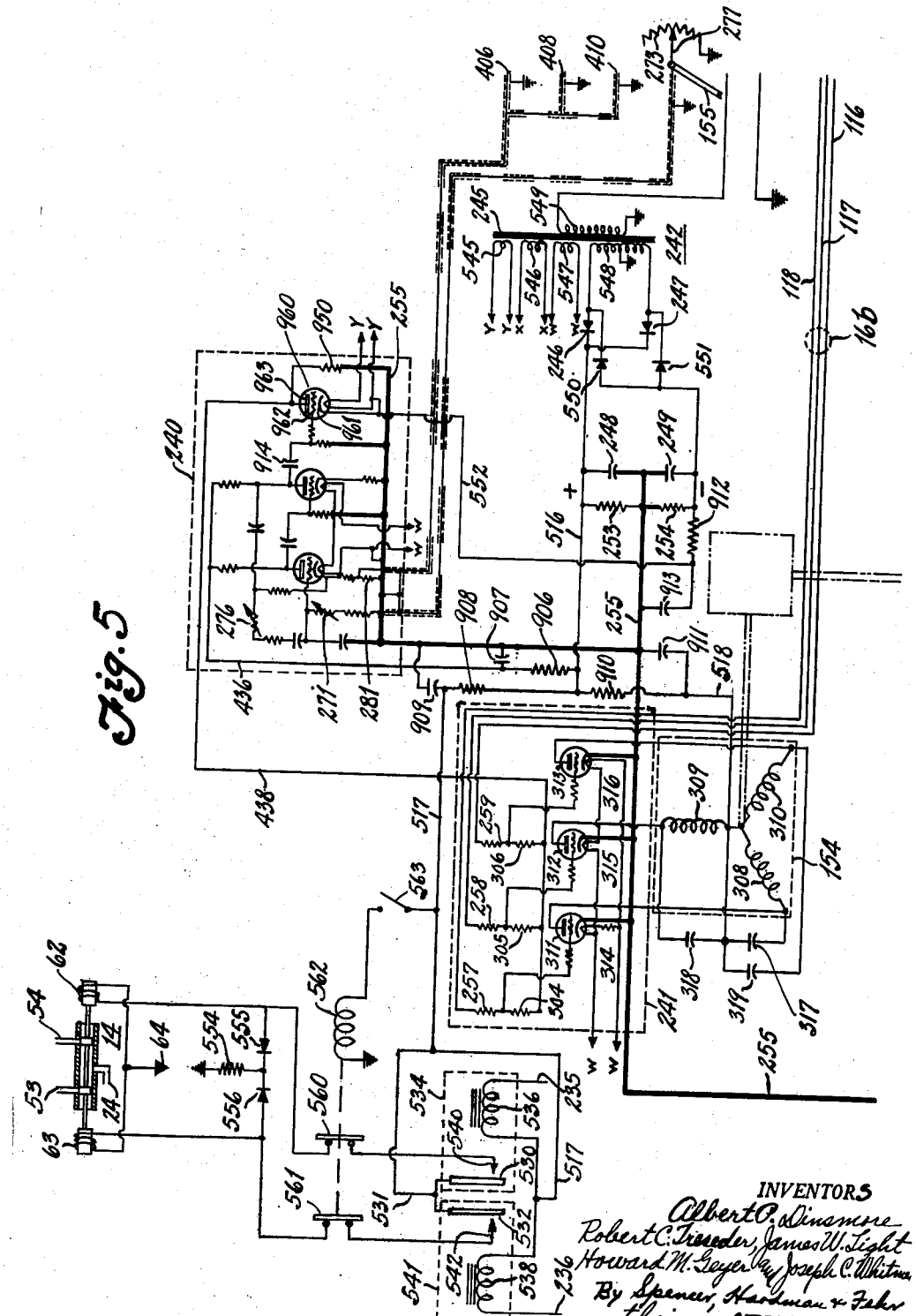

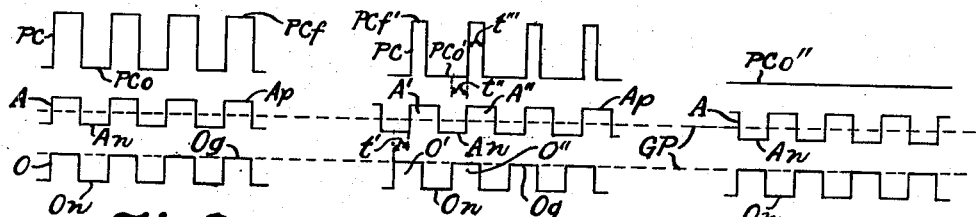
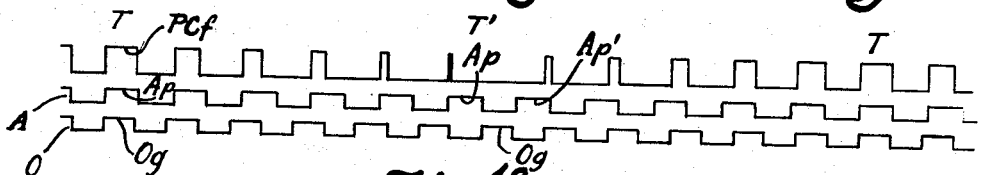
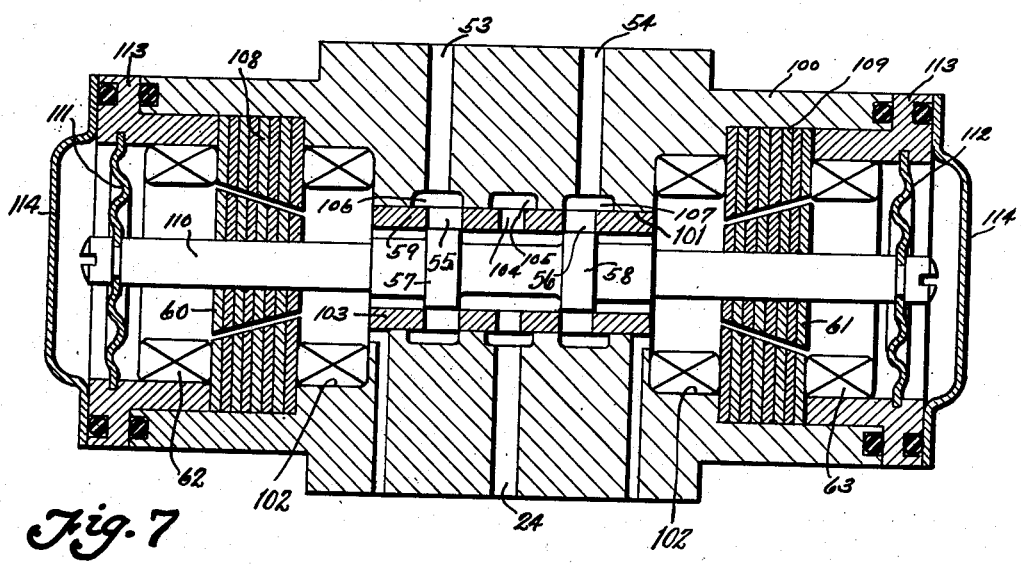
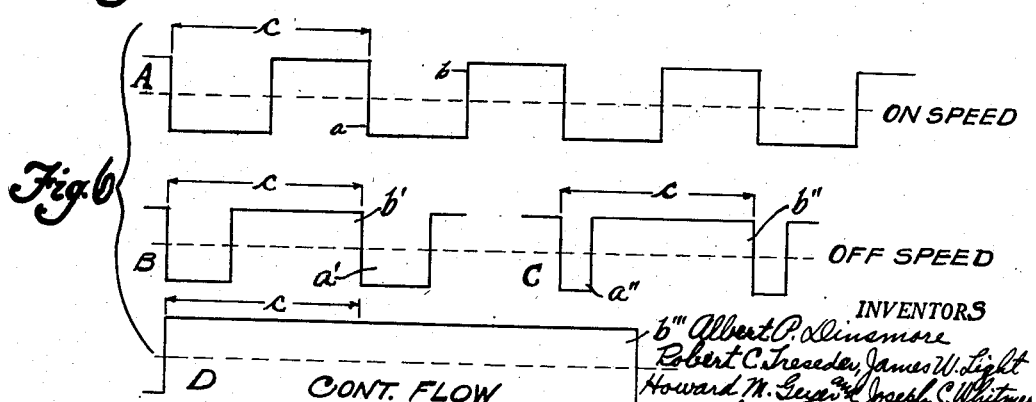

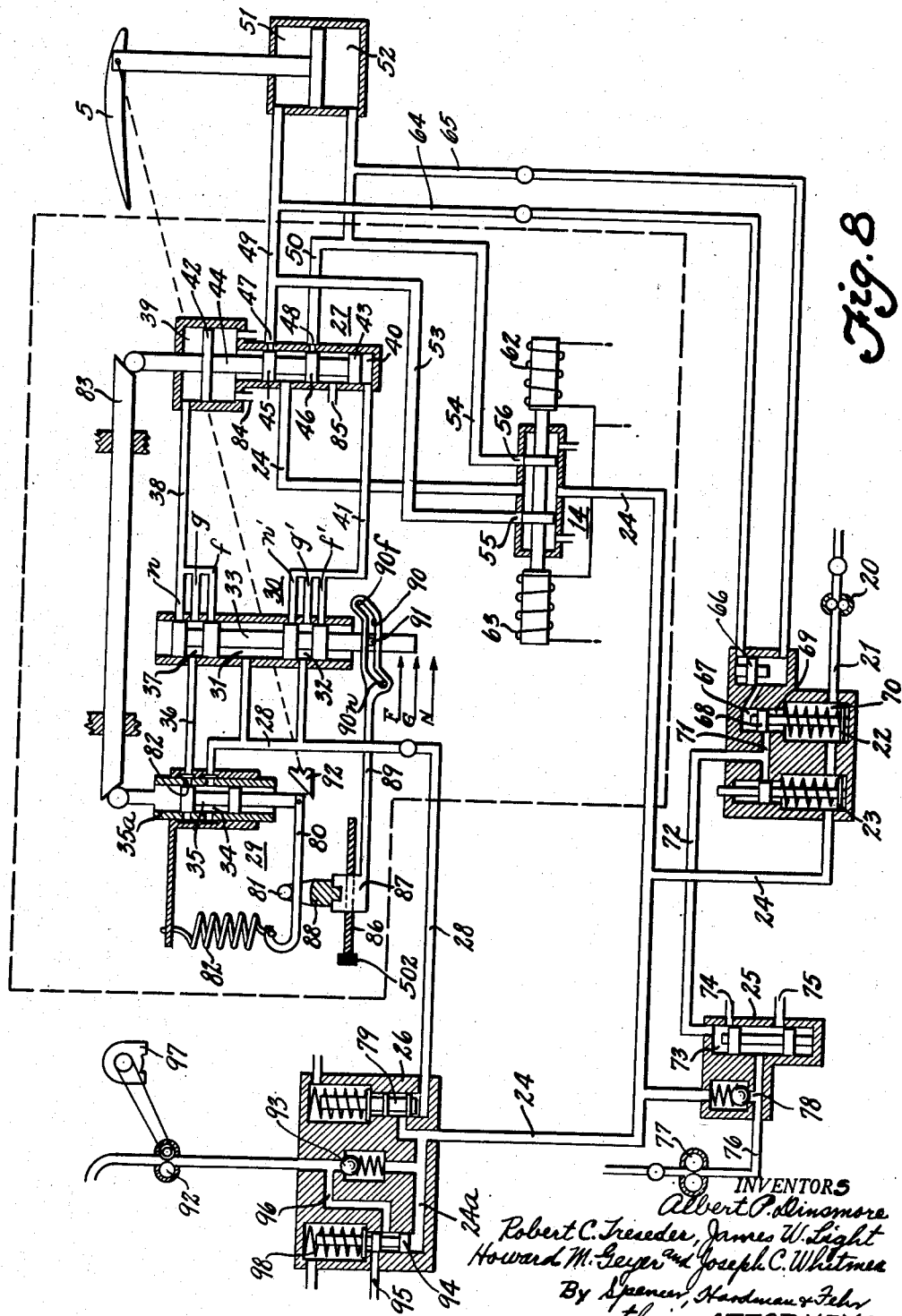

2,669,312

UNITED STATES PATENT OFFICE 2,669,312

AIRCRAFT PROPELLER SPEED CONTROLLER

Albert P. Dinsmore and Robert C. Treseder, Dayton, James W. Light, Greenville, Howard M. Geyer, Dayton, and Joseph C. Whitmer, Bradford, Ohio, assignors to General Motors Corporation, Detroit, Mich., a corporation of Delaware Application May 24, 1949, Serial No. 94,984

29 Claims. (Cl. 170—160.17)

The present invention relates to mechanism for controlling the speed of a prime mover. More particularly, it relates to mechanism for controlling the pitch of a propeller driven by a prime mover so as to maintain the rotational velocity of the prime movers at a selected value. The term prime mover is here used in its broadest scope and is intended to refer to engine, motor, or other power plant device including turbines, whose speed control is the more critical and hence the objective of this invention.

In aircraft installations where the prime movers driving the propellers are gas turbines the controls used must be both precise and sensitive, in fact the controls, if they provide the proper governing action, must provide precise speed settings; they must provide instantaneous control; they must be sensitive to accelerations and decelerations as well as off-speeds; and it is desirable that they provide a means for synchronizing the several units of a multi-turbine installation. Those necessities obtain because of the characteristics of turbine power plants in general, and must take into account that turbines have relatively large rotational inertias compared with reciprocating engines of the same power output; that they have smaller allowable off-speeds due to the very small safety margins existing in highly heated, centrifugally loaded turbine blades; that a minimum starting torque must be available because the turbines do not become self-sustaining until about 50% of their maximum rated speed has been reached; and that the turbines, when coupled with dual propellers in multiple installations, necessitate much more closely matched speeds than do single rotation propellers for synchronization. A satisfactory controlling mechanism then must be able to:

1. Set or select speeds of turbine-propeller operation;
2. Govern and hold the set or selected speed under normal conditions of operation; and
3. Synchronize multiple unit installations.

It is therefore an object of the present invention to provide a control mechanism which will detect minute off-speed conditions and effect return to the desired speed accurately.

It is another object of the present invention to provide apparatus which will continuously regulate and control the speed of a prime mover over a predetermined range of rotational velocities.

It is another object of the present invention to provide control apparatus for rotating machinery which is both sensitive and fast in order to minimize both over-speed and under-speed conditions.

It is also an object of the present invention to provide rotating equipment control apparatus with anti-hunt and damping provisions.

It is another object of the present invention to provide a control apparatus which will continuously correct drift in rotational velocity.

It is another object of the present invention to provide control apparatus that can be easily adapted for operation with any number of similar units.

It is another object of the present invention to provide control apparatus with combined provision for governing speeds to approximately a predetermined rotational velocity and having means for correcting slight off-speeds of rotary members to the exact predetermined speed.

Another object of the present invention is to provide governing apparatus whereby closely governed operation of rotational members with respect to a reference speed may be accomplished.

It is another object of the present invention to provide dual control for propeller pitch actuation, one of the controls to govern when the propeller is off-speed a large amount, and the other control to govern when the off-speed is only slight.

Another object of the present invention is to provide control apparatus of the electro-hydraulic type for variable pitch propellers, such apparatus adapted to supplement hydraulic governing mechanism for minute adjustment of the propeller pitch to obtain a predetermined rotational velocity and for sensing acceleration and deceleration and correcting this change in rotational velocity in such a way as to prevent hunting.

It is another object of the present invention to provide electro-hydraulic variable pitch propeller controlled apparatus adapted to supplement or replace hydraulic governing mechanism for adjustment of propeller pitch, said electro-hydraulic apparatus being capable of sensing rate of change of rotational velocity and compensate therefore to prevent hunting.

Another object of the present invention is to provide control apparatus whereby the speed of rotary members may be regulated by the adjustment of a direct current potential.

It is another object of the present invention to provide control apparatus for propeller pitch adjusting hydraulic mechanisms whereby pulses of fluid under pressure are alternately applied to opposite sides of a double-acting propeller servomotor, these pulses being of equal magnitude for on-speed control and of unequal magnitude when the propeller is off-speed.

It is still another object of the present invention to provide an electro-hydraulic servo mechanism with means for sensing rate of movement of the controlled mechanism and for correcting this rate of movement when producing speed errors.

Other objects of the present invention will become apparent upon reading of the specification with respect to the drawings and as will be particularly pointed out in the claims.

The present invention provides a mechanism which is highly effective to control rotational speeds to very close limits. This is accomplished by providing two overlapping controls, one for off-speeds of a large magnitude (for example over 30 R. P. M.), and one for off-speeds of small magnitude (for example less than 30 R. P. M.). These two controls overlap so that transition from one type of control to the other type is smooth.

For a small off-speed condition, an electronic governor energizes solenoids to actuate a valve in the control line of the hydraulic governor, and governs by alternately opening the two control passages of the fluid servomotor by a series of alternately pulsating movements. When the off-speed is great, the control lines of the hydraulic governor are held open permitting continuous flow to the fluid servomotor until the proper correction is made. While both the electronic and the hydraulic governing means will then be working together in the same direction, the hydraulic means being of greater capacity completely dominates the governing function until the off-speed has been reduced to the said small off-speed condition, and then the electronic means predominates to effect the fine control. The hydraulic governor is contained within a regulator carried by the rotating propeller and is self-operative by rotation for effecting a source of fluid pressure in a hydraulic system. This pressure may be applied, through the action of a speed responsive valve, to the proper chambers of a distributor valve for applying the high pressure source to a fluid servo for changing the blade pitch.

In the illustrated embodiment of the present invention, the electronic governor means utilizes a bridge whose output potentials affect an electronic multi-vibrator-amplifier arrangement to control the propeller pitch. This arrangement gives pulses which automatically vary in length with the variation in potential at the output of the bridge circuit. A reference speed setting is accomplished by varying the magnitude of the passive elements contained in the circuit.

Referring to the figures of the drawings.

Figure 4:
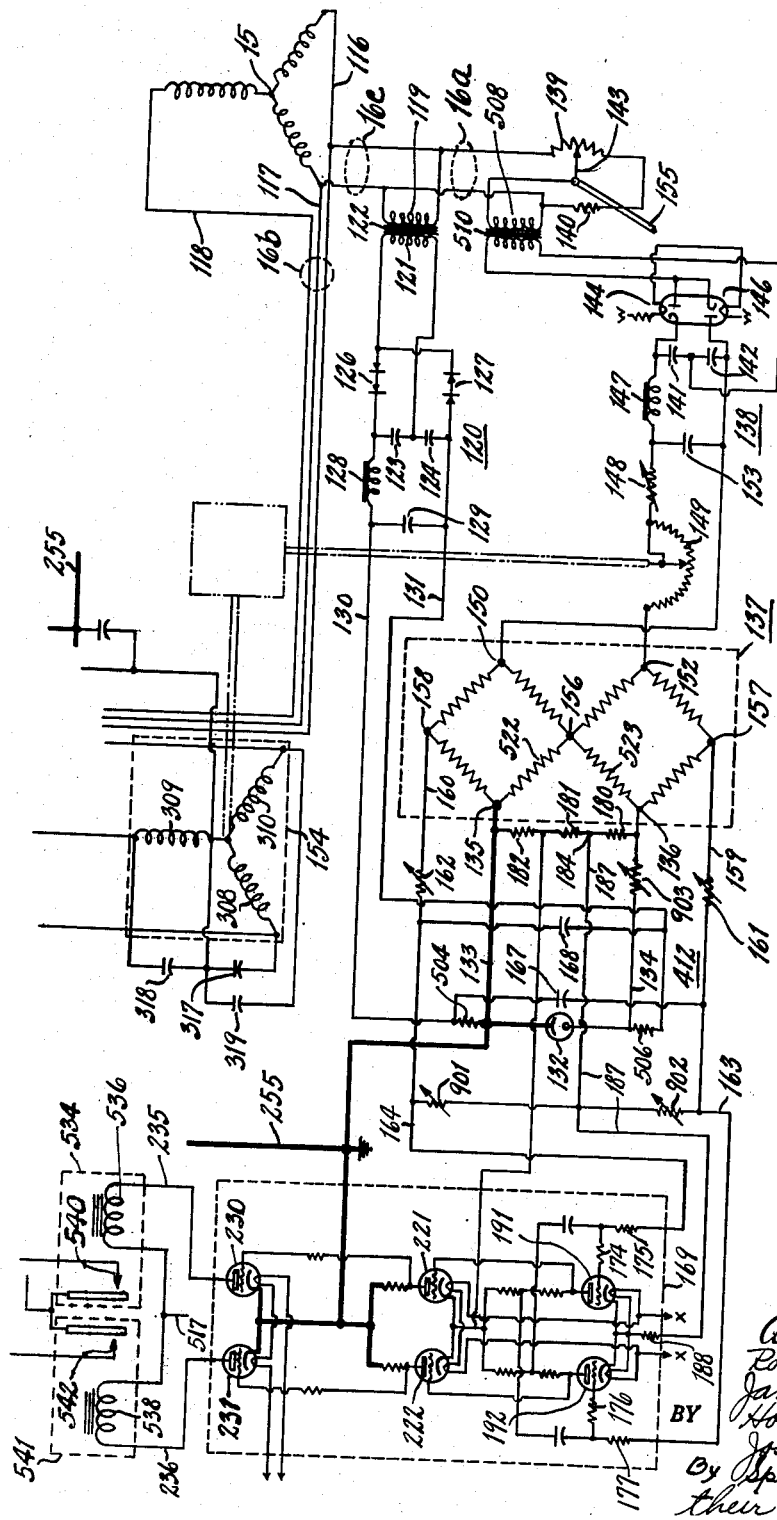

Fig. 4 and 5 together show a circuit diagram illustrating an electronic governor and means for selecting the basic speed level at which the governor is to control, and the means by which synchronism between a plurality of rotary devices is accomplished.

Fig. 6 is a graphical showing of the action of the solenoid valve illustrated in Fig. 7.

Fig. 7 is a sectional view of a solenoid actuated valve used in one embodiment of the present invention.

Fig. 8 shows a hydraulic circuit utilized in the present invention.

Figs. 9, 10 and 11 show the phase discriminator voltage relationship under different static conditions.

Fig. 12 shows the relationship of the various voltages and currents of one of the phase discriminator tubes under dynamic conditions.

Figure 13:
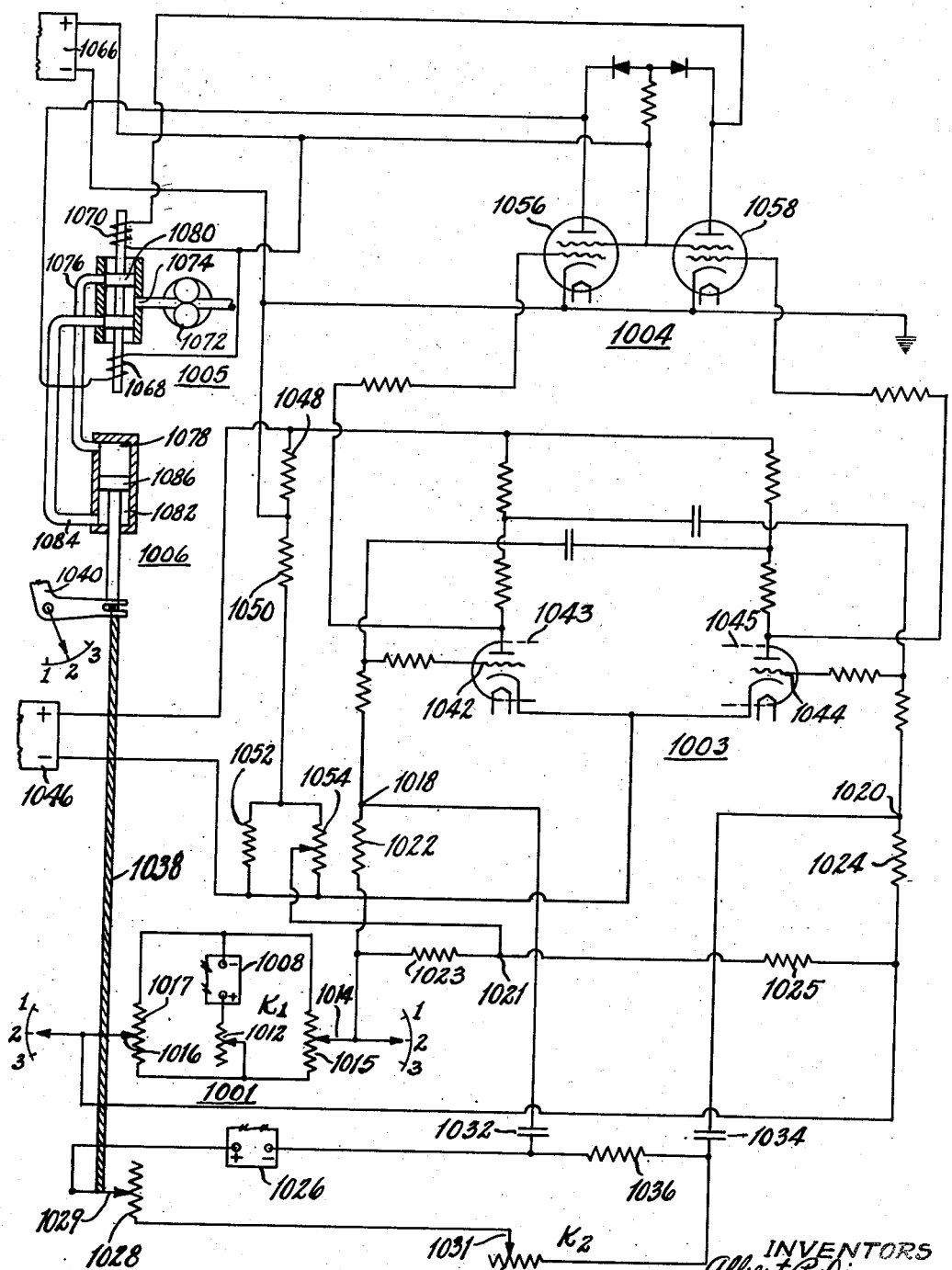

Fig. 13 shows various components of the present invention utilized in a position controlled servo mechanism.

Figure 1:
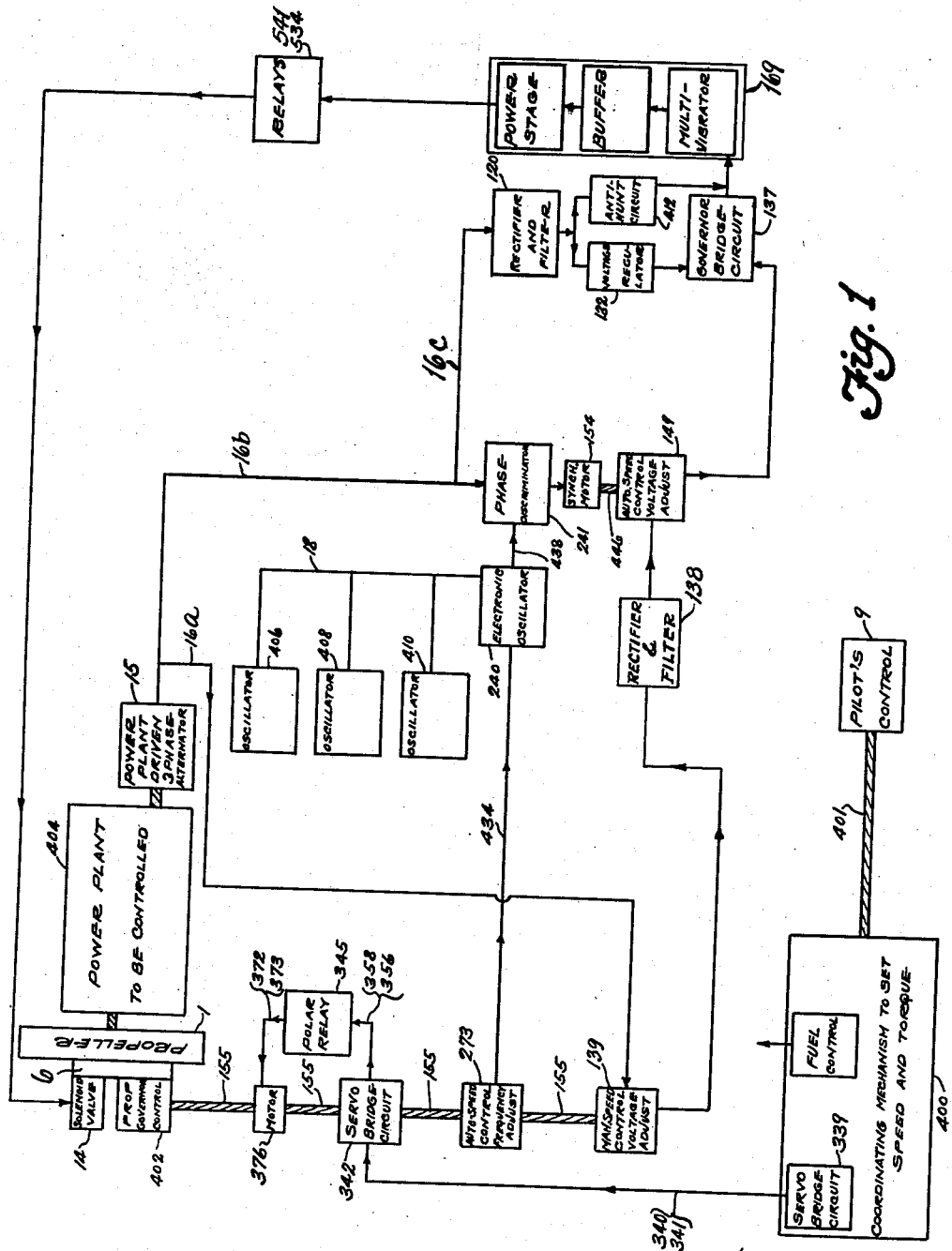
Fig. 1 is a block diagram showing the relationship of the component parts of the electro-hydraulic governor.

Referring now to Fig. 1, this figure is a block diagram showing the various independent elements and sub-assemblies comprising a control system embodying the present invention. The description of the block diagram will be general to describe the overall operation of the mechanism. Each of the various elements contained in the block diagram will be described in greater clarity in connection with other figures in the drawings. Referring to this block diagram, the single lines refer to electrical connections while the cross-hatched broader lines refer to mechanical connections.

The power plant 404 to be controlled may be a reciprocating piston internal combustion engine, a gas turbine or other prime mover of this general type. The invention will be particularly described as relating to an aircraft power plant propeller combination but is not to be so limited. For example, the power plant is here illustrated as being connected to an aircraft propeller 1 but a marine propeller or other load device may be used without departing from the scope of this invention. In this specific illustration, the load device is a variable pitch propeller in which the angle of attack of the blades may be adjusted by means of a piston type fluid motor. The fluid motor, and hence the pitch angle of the propeller, is subject to a fine, and a concurrent fine and coarse control. Under conditions in which the speed of rotation of the propeller departs from the desired speed by a large amount, a propeller governor control 402 adjusts the hydraulic regulator 6 to increase or decrease the pitch angle of the propeller 1 so as to adjust the load on the power plant 404 and thereby to bring it to approximately the desired speed.

The final control (for small off-speeds) is made by the electro-hydraulic part of the dual control which is operated by an electronic mechanism which comprises a large number of elements and sub-assemblies to be described later.

Figure 2:
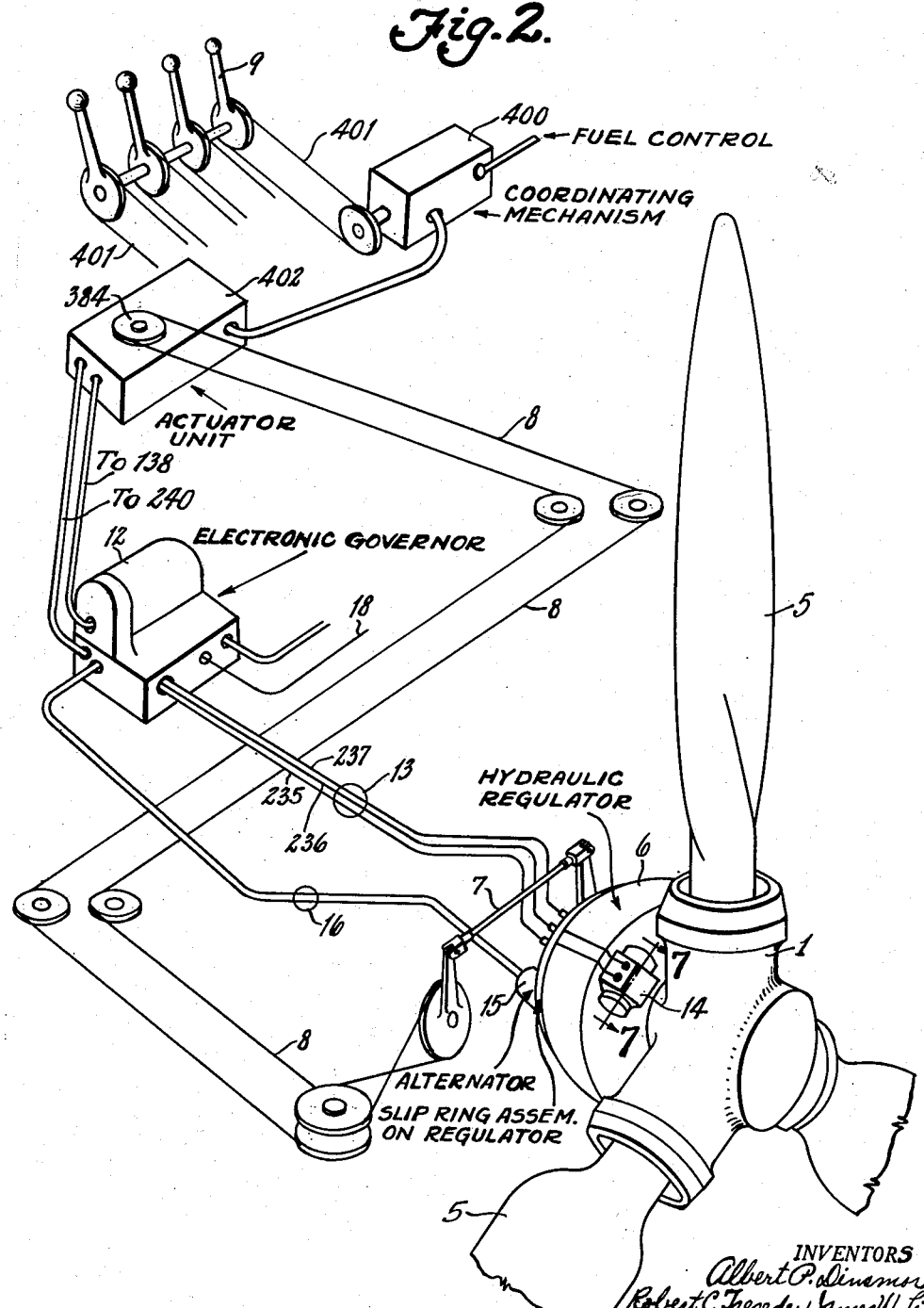
Fig. 2 is a schematic layout showing a portion of the apparatus in the instant invention.
Figure 3:
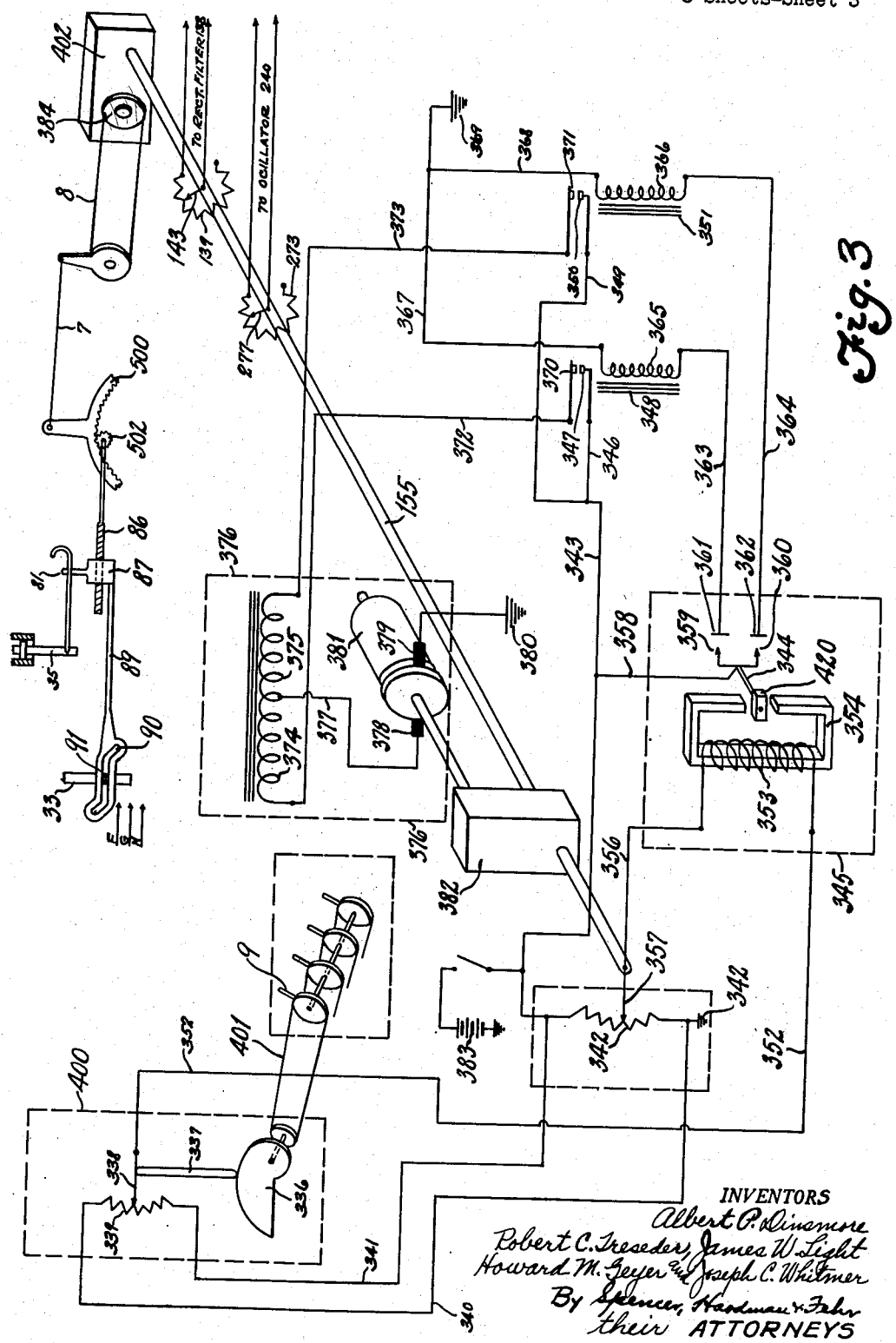
Fig. 3 is a schematic showing of the pilot control members.

Referring now generally to Figs. 1, 2 and 3, the operating conditions of the power plant or power plants is selected by the control lever 9. This control lever is mechanically connected by a drive 401 to a coordinating mechanism 400 which includes potentiometer 339 of a bridge circuit. The second half of this bridge circuit includes potentiometer 342. Unbalance of this bridge circuit, caused by mis-match of the position of contacts 338 and 357, causes an unbalance signal of magnitude and polarity dependent upon this mis-match and fed by means of conductors 355 and 357 to polarized relay 345. This relay energizes motor 376 for either clockwise or counter-clockwise rotation dependent upon the polarity of the unbalance signal and hence the direction of mis-match of the contacts 338 and 357. The motor 376 is connected to shaft 155 through a suitable gear reduction mechanism 382. The movement of this shaft 155 rebalances the bridge circuit 339—342 by adjusting the contact 357 so that it again matches the position of the contact 338. Movement of this shaft also adjusts speed control potentiometer 139 and oscillator frequency control potentiometer 273 while resetting the automatic speed control governor 402. The power plant 404 is regulated to approximate speed by the propeller governor control 402 and is directly connected to a three-phase alternator 15 which generates a signal proportional in both amplitude and frequency to the speed of the power plant. One phase of the output signal of the alternator 15 follows two paths, one directly leading to the circuit 120, by cables 16b and 16c, and the other by cable 16a through the manual speed control 139 to circuit 138. A D. C. voltage from rectifier-filter circuit 120 is limited by a voltage regulator 132 and is fed into one side of a bridge circuit 137 to act as a reference voltage for fine speed control. A D. C. voltage from rectifier-filter circuit 138 is set by the manual speed control 139 and is fed through the automatic speed control 149 to the opposite side of the bridge circuit as a D. C. control voltage varying as a function of power plant speed for comparison with the reference voltage from circuit 120. The circuit 120 is also fed into an anti-hunt circuit 412 to generate a rate signal which, in conjunction with the error signal from the bridge 137, is impressed as bias upon a multi-vibrator in unit 169 where proportional pulses are formed, amplified by a buffer, and a power stage for energizing suitable relays 534, 541, controlling a solenoid valve 14 operatively connected into the control of the hydraulic regulator 6.

Fig. 2 is a schematic diagram showing certain of the linkage incorporated in the present invention. Each of the propellers 1 has a plurality of blades 5, the pitch of which can be adjusted by means of hydraulic regulator 6. This regulator is controlled for initial speed setting by a mechanical linkage 7 and cables 8 from the actuator unit 402. Each of the pilot control levers 9 adjust an associated coordinating mechanism 400 which controls the amount of fuel fed into the power plant as well as controlling its associated actuator unit 402. Each actuator unit controls its corresponding electronic governor 12, which governor is connected to the solenoid operated hydraulic valve 14 by means of an electrical cable 13 having conductors 235, 236 and 237. This solenoid valve 14 is hydraulically connected to the regulator 6 for the propeller hub. The engine driven alternator 15 provides an input signal to the electronic governor 12 through electrical cable 16. This electronic governor if desired may be locked in step with other governors through electrical cable 18 for synchronizing a plurality of power plants.

Fig. 3 shows in greater detail, certain of the mechanical and electrical linkages schematically shown in Fig. 2. Referring to this figure, it will be noted that the pilot control lever 9 is connected to a coordinating mechanism 400 by means of cable 401, and therein drives a cam 336. This cam has a proper contour so that its rotation, together with the linkage 337, gives proper movement of the contact 338 of potentiometer 339 to produce desired unbalanced signals in the control bridge circuit. Under conditions of bridge unbalance, a signal appears between the conductors 352 and 356 of magnitude and polarity which are direct functions of the magnitude and direction of mismatch between the movable contacts 338 and 357. This signal is produced due to the unbalanced D. C. bridge circuit associated with the power source 383. Under one condition of unbalance of the bridge circuit, for example, adjusting the power plant for higher speed, a current in one direction is produced through the relay coil 353 to close contacts 359 and 361. Under opposite conditions of unbalance, namely, adjusting the power plant for lower speed, current flows in the reverse direction through the coil 353, thus causing the closing of contacts 360—362. The field magnetic flux of core 354 is reversed under conditions of reversal of current in the coil 353 and thereby reverses the direction of rotation of the polarized armature coil 420, carrying the movable contacts 359 and 360 of the polarized relay. The closing of contacts 359—361 or contacts 360—362 energizes relay coil 365 or 366, respectively. The coil 365 is energized from power source 383 through conductors 343, 358, 363 and 367 to ground. The energization of the coil 365 produces a magnetic flux in the core 348 to close the contacts 347—370 and thereby close a circuit from conductor 343 through conductors 346, 372 to field coil 374 of the motor 376. This causes energization of the motor so that the armature 381 through gear box 382, drives the shaft 155 in such direction as to decrease the propeller pitch. This shaft also drives the contact 357 so as to rebalance the bridge. Under conditions of overspeed when the contacts 360—362 are closed, a circuit is completed through the relay coil 366 from power source 383, conductors 343, 358, 364 and 368 to ground 369. Under these conditions, contacts 350, 371 close completing a circuit from power source 383 through conductors 343, 349, 373, field coil 375 of the motor 376, conductor 377, brush 378, armature 381, brush 379 to ground 380. The armature 381, under these conditions, rotates in the opposite direction to that mentioned above to cause decrease in speed of the power plant and to rebalance the bridge circuit including the potentiometer 342. It may be seen from inspection of this figure that the shaft 155 also drives the contact 277 of the automatic speed control frequency potentiometer 273 to vary the frequency of oscillator 240. This shaft simultaneously adjusts the movable contact 143 of the manual speed control potentiometer 139. The shaft 155 also drives the control 402, which acting through the cable 8 and linkage 7, moves the rack 500 to rotate a screw shaft 86 through pinion 502 to adjust a speed sensitive valve 35, as will be described with reference to Fig. 8. The actuator mechanism of Fig. 3 keeps the two governing systems substantially in step by coincident adjustment of the two potentiometers 139 and 273 for the electronic governor, and the rack 500 of the hydraulic governor so that the coaction of two related governing systems covers the entire range of desirable pitch shift movement.

Preliminary to detailed description of the electronic governor that is able to (1) set a precise speed of turbine operation; (2) govern and hold the selected speed under normal conditions; and (3) may be required to synchronize multiple unit installations, it should be understood that the electronic governor, in addition to having simple proportional sensitivity, also has rate and integral sensitivity which may be designated as $K_1$, $K_2$ and $K_3$ respectively. $K_1$ is the proportionality between rate of change of propeller blade angle and error between turbine or other prime mover speed and governor setting, $$K_1 = \frac{\frac{d\beta}{dt}}{N_{pm} - N_s}$$

$K_2$ is the proportionality between rate of change of propeller blade angle and rate of change of prime mover speed, $$K_2 = \frac{\frac{d\beta}{dt}}{\frac{dN_{pm}}{dt}}$$

$K_3$ is the proportionality between rate of change of governor setting and error between a master reference speed index and prime mover speed, $$K_3 = \frac{\frac{dN_s}{dt}}{N_{mr} - N_{pm}}$$

Control by the electronic means for adjustment in accordance with those constants is effected by the means and mechanism diagrammatically indicated in Figs. 4 and 5.

Any device presuming to control an engine, a turbine or other device, as to speed must in principle, compare a current speed with either a reference speed source, or with a lever setting or other index representative of the reference speed. Also, such device, that is, a speed controller or governor, to be effective, must sense some difference in the speed factors compared and manifest in either amount or character of speed difference. Further, any speed controller or governor is not complete unless it provides means for translating the speed difference detected into some form of power applicable to effect a desired or indicated change in the speed of the controlled device. Thus, a speed controller or governor must comprise a comparator, a sensator and an applicator. These elements may exist as separate and distinct units of structure, or they may be structurally combined and appear as but one or more units.

Referring now more particularly to Figs. 4 and 5, we will give a more detailed description of the operation of the electronic governor and the method in which its forms the $K_1$, $K_2$ and $K_3$ control functions.

$K_1$ control

Referring to Figs. 4 and 5 for description of the electronic governor, all ground connections are indicated by heavy lines marked as 255, and all grounds are common. In the instant construction, the three-phase alternator 15 is driven at a speed in proportion to turbine speed and provides outlet leads 116, 117 and 118 comprising cable 16b as indicated in Fig. 1 and as shown in Fig. 4. Over this output there appears a medium susceptible of comparison for speed controlling, for speed governing, and even speed synchronizing if the latter is desired. Two transformers 122 and 510 are supplied with alternating current from conductors 116 and 117 representing one phase of the alternator 15. The outputs from these transformers feed through circuits 120 and 138 respectively to opposite sides of a bridge circuit 137, where the comparison of speed factors and sensing of differences occur.

The circuit 120 provides a D. C. reference voltage for input to the bridge 137 at points 135 and 136, the circuit 120 comprising a secondary 121, rectifiers 126 and 127 in combination with capacitors 123 and 124, inductance 128 and capacitor 129. The output of the circuit, therefor, over 130 and 131 is a D. C. voltage impressed across a series circuit consisting of resistor 504, voltage regulator 132 and resistor 506, in which the regulator 132 controls the voltage delivered to bridge input terminals 135 and 136 through a portion of conductor 255 indicated at 133, and through conductor 134 including series resistor 903 which is adjustable for calibration. In this manner, there is provided at the points 135 and 136 a reference voltage as a standard for comparison.

The circuit 138 provides a D. C. voltage proportional to turbine or engine speed and feeds it to the bridge 137 at points 150 and 152. The input from alternator 15 to transformer 510 is subject to manually controlled variations (by 139). The circuit 138 comprises rectifiers 144 and 146 in combination with capacitors 141 and 142 followed by inductor 147 and capacitor 153 to provide a D. C. voltage proportional to alternator or turbine speed. This output, traversing calibrating adjustment 148 and potentiometer 149 (automatic speed control), is impressed upon points 150 and 152 of the bridge 137 as the second factor for comparison.

The magnitude of the D. C. voltage appearing at the bridge input terminals 150 and 152 is made adjustable by means of the manual control of potentiometer 139 operated by shaft 155 as described earlier in connection with Fig. 3, and also by means of an automatic control of potentiometer 149 to be described later in connection with $K_3$ control.

The bridge circuit 137 is the sensing comparator in the governing system under consideration, since it compares a speed factor in itself proportional to turbine speed delivered over the circuit 138, with a constant reference speed factor delivered over circuit 120, and senses differences. The difference voltage appears as a voltage at output terminals 157 and 158, to be impressed upon leads 159 and 160 by which the difference voltage finds its way to an applicator 160.

The bridge circuit 137 consists of eight equal resistors as shown connected across 135, 136, 150, 152 so that when the voltage appearing across terminals 150 and 152 is equal to that appearing across terminals 135 and 136, the bridge will be balanced and no voltage will appear across the output terminal points 157 and 158. For purposes of explanation, the mid-point 156 of the bridge may be used as a reference point. When the unregulated voltage between the terminals 150 and 152 equals the regulated reference voltage across the terminals 135 and 136, the potentials of the points 157 and 158 will equal that at the point 156. If however, the voltage across the points 150 and 152 is greater than the voltage across points 135 and 136, the point 157 will become positive with respect to point 156, and the point 158 will become negative with respect to the point 156. Thus when the alternator 15 increases speed from a speed at which the bridge circuit 137 is in balance, a positive and negative potential with respect to the point 156 will appear at points 157 and 158, respectively. The opposite is true when the alternator speed decreases.

Specifically, if there is a speed error, and the D. C. voltage applied to points 150 and 152 of the bridge is increased, for example, by one (1) volt, then a potential difference of one-half (½) volt will appear across the points 157 and 158 of the bridge. The point 157 assumes a potential with respect to point 156 of plus one-quarter (+¼) volt and point 158 assumes a potential of minus one-quarter (—¼) volt. If the speed error is twice as great and there is an increase of two (2) volts at 150 and 152 then a potential of one (1) volt will appear across 157 and 158, plus one-half (+½) volt at 157 and minus one-half (—½) volt at 158. Thus, equal voltages of opposite polarity appear at the bridge output terminals 157 and 158 which, in a governing sense, are a direct function of speed error.

The resistor network across the points 135 and 136, including the resistors 180, 181 and 182 together with the resistors 522 and 523 of the bridge 137, forms another bridge circuit. If the value of the resistor 180 is equal to the value of the resistors 181 and 182 combined, the potential of the point 184 is equal to that of the point 156. This resistor 180, however, may be adjusted for purposes of calibration to provide small potential differences to exist between points 184 and 156 as may be required for adjustment of the multi-vibrator circuit. The point 184 of the resistor network is connected by means of conductor 187 and resistor 188 to the cathodes of both the tubes 191 and 192 of a multi-vibrator circuit. The point 158 is connected to the grid of the tube 191 by means of conductor 160, resistance 162, conductor 164 and resistors 175 and 174. The terminal 157 is connected to the grid of the tube 192 by means of conductor 159, resistor 161, conductor 163 and resistors 177, 176. Attenuator networks comprising resistors 162 and 901 on the one hand, and resistors 161 and 902 on the other hand, are inserted as fixed sensitivity adjustments. By means of these networks, that part of the potential difference between the points 158 and 156 which appears across resistor 901, will appear as a grid bias on the tube 191, while that part of the potential difference between the points 157 and 156 which appears across resistor 902, will appear as a grid bias on the tube 192. Thus, the potentials appearing across the output terminals 157—158 of the bridge circuit, form a means of control of the multi-vibrator circuit.

The multi-vibrator circuit is of conventional design using triode tubes 191 and 192. A modification of the usual multi-vibrator circuit is provided for adjusting the biases on the tubes 191 and 192 to control the symmetry of the multi-vibrator output signal. This modification includes applying as bias voltages, the potentials which are developed across resistors 901 and 902, connected to the output terminals of the bridge 137. When the bias voltages applied to the grids of these two tubes are zero, the circuit is a standard multi-vibrator circuit in which the wave form of the output signal is symmetrical and approximately square, and the pulse ratio may be considered as unity or of 50:50 ratio. If, however, the bias on the grid of one of the tubes becomes slightly negative while the bias on the grid of the other tube becomes slightly positive, the conduction times of the two tubes are not equal and the signal wave form is unsymmetrical with the pulse ratio in other than 50:50 ratio (e. g. 60:40). This action of course may be reversed by reversing the relation of the bias voltages.

With respect to this variation of bias, it should be obvious that the on-speed condition, as represented by the application of zero bias signals from the bridge output terminals 157 and 158 upon the tubes 191 and 192, will effect a 50:50 pulse ratio. An over-speed condition will produce a positive potential at point 157 on bridge 137 and in turn, deliver a positive bias to multivibrator tube 192. In a similar manner, the tube 191 will receive a negative bias from point 158. These bias voltages make the conduction time of tube 191 shorter, and that of tube 192 longer, thus producing a pulse ratio other than 50:50, for example, 40:60. Continuously increasing over-speeds will produce ratios of 30:70, 20:80, etc., until tube 192 becomes continuously conducting while tube 191 remains inactive and pulsing ceases. On the other hand, an under-speed condition of the power plant will effect a reversal of the action of tubes 191 and 192 producing pulse ratios 60:40, 70:30, etc., resulting finally in tube 191 becoming continuously conducting and tube 192 becoming inactive.

The power level of the signals at the plates of the multi-vibrator tubes is insufficient to operate control devices capable of changing the speed of the power plant; for instance, as here applied, to the change of blade pitch of the propeller driven by the turbine. In the installation illustrated, a direct coupled amplifier system including buffer tubes 221 and 222 and power tubes 230 and 231 is used. The power tube output signals are impressed on the leads 235 and 236 to energize one or the other of relays generally indicated at 534 and 541, respectively. These relays have windings 536 and 538, respectively, serially connected across the leads 235 and 236 with a connection at mid-point to a power line 517 connected with the positive side of the power supply 242. Contact element 540 connects with solenoid winding 62 and contact element 542 connects with solenoid winding 63. The windings 62 and 63 have a common ground connection 64. Cooperating with the contact elements 540 and 542 are armatures 530 and 532 joined with a common lead at point 531 making connection with an electric power source suitable for the actuation of solenoid valve 14.

Any off-speed of the turbine therefore manifests itself in proportionately differing electrical pulses impressed upon the conductors 235 and 236 and thereafter transmitted by the relays 534 and 541, respectively, to the solenoid windings 62 and 63. This effects such movement of the valve 14 as to apply corrections (of the nature shown in graphs A to D of Fig. 6) to the blade servomotor in the hydraulic regulator 6. This will be described in detail with respect to Fig. 8.

During on-speed conditions, the solenoid 14 is given equal and alternate pulses on the windings 62 and 63 so that the hydraulic pulses in control passages 53 and 54 are equal. Such energization causes the servo mechanism to maintain the blade 5 in a substantially constant position. During a condition of power plant off-speed, the solenoid actuated valve 14 is given a series of alternating pulses of unequal pulse duration. For example, if the engine or turbine is experiencing an over-speed, the solenoid actuated valve will oscillate under such conditions as to open the control passage 54 for a longer duration of time than it does the control passage 53. The blade servomotor, under such conditions, will be actuated in a direction to increase the propeller blade pitch angle and thereby reduce and correct the power plant speed. For conditions of power plant under-speed, the relationship of pulse length and therefore unequal opening of the passages 53 and 54 will be reversed and a corresponding decrease of propeller blade angle will be made, resulting in an increase in power plant speed. If the power plant being controlled, is off-speed a large amount, the magnitude of the voltage from the bridge circuit 137 will be such as to cause one of the multivibrator tubes to be cut off and the other tube to conduct constantly. This results in continuous current flow through one of the conductors 235 or 236 with its corresponding relay operated to energize one of the windings of solenoid actuated valve 14 continuously. This maintains either passage 53 or 54 open to give full rate of change of propeller pitch and thereby effects maximum correction of power plant speed.

An arc suppression circuit consisting of rectifiers 555 and 556 and resistor 554 is provided across the load circuit to minimize arcing of the switching contacts of the relays 534 and 541.

It is desirable under certain conditions of operation, for example, during propeller-feathering or propeller operation in the negative pitch range, to disable the effective operation of the solenoid valve 14, and for that purpose a disconnect relay is provided for operating switch contacts 560 and 561; the relay coil 562 being automatically energized when propeller feathering, or any condition of operation other than normal governing, is selected.

It is necessary during on-speed conditions that the voltages appearing across the two pairs of input terminals of bridge network 137 be equal. In order to accomplish this condition, an attenuation network is provided so the speed responsive voltage across 150 and 152 of the bridge 137 may be made the same at the preselected speed as the reference voltage at the points 135—136. The attenuation necessary is accomplished by means of a manual speed control potentiometer 139 and a series connected fixed resistor 140.

Referring to Fig. 4 of the drawings, the same phase of the alternator 15 impressed upon the winding 119 is impressed across the potentiometer 139 and resistor 140 to furnish the desired voltage amplitude across the primary 509 of the transformer 510. The movable contact 143 of this potentiometer is driven by the shaft 155 to adjust the proportion of the A. C. voltage from the alternator 15 to be impressed across the primary 509. This voltage determines the A. C. input to the rectifier-filter circuit 138 and thereby the D. C. voltage to be applied to the points 150 and 152 of the governor bridge circuit.

The potentiometer 139 acts as a primary speed control to select the preset speed at which the bridge circuit 137 will balance and thereby determines the value of the governed speed.

Thus far, we have a complete governing system which may be set to govern at any desired speed by means of the speed control 139. The governing action is that of a simple proportional or $K_1$ governor. In controlling rotary machines, such as turbines, which have large rotational inertias, simple proportional governors often cause hunting conditions to occur, which not only impair governing action, but produce dangerous speed oscillations. An acceleration sensitive control or some form of anticipatory control must be incorporated to provide the damping required with the high rates of $K_1$ control needed for fast governor action. Such acceleration sensitive control has earlier been defined as $K_2$ control, a proportionality between rate of pitch change and rate of change of turbine speed.

$K_2$ control

In order to provide a governor that will be sensitive to accelerations and decelerations of the turbine or other power plant, a control is provided that senses rate of change of speed of the power plant and responds in terms of propeller pitch changes. This control includes a circuit which converts accelerations or decelerations of the power plant speed into positive or negative D. C. bias potentials, the absolute value of which are instantaneously proportional to, and in proper relation or sign to, the accelerations or decelerations of the power plant speed. In the heretofore described electronic governor for $K_1$ control, there are two resistors 504 and 506, in series with the voltage regulator tube 132, between conductors 130 and 131. Electrically connected across these resistors 504 and 506 are two circuits consisting of capacitor 167 and resistor 902 on the one hand; and, capacitor 168 and resistor 901 on the other hand, resistors 901 and 902 having a common connection to 184 through 187. The values of these capacitors and resistors are such that the circuits act as electrical differentiating circuits and provide equal voltages of opposite polarity across resistors 901 and 902 which vary as the first differential of the voltage changes appearing between conductors 130 and 131. Since this latter voltage is directly proportional to speed, the voltages across resistors 901 and 902 are therefore proportional to rate of change of speed, reversing their polarities respectively for power plant accelerations and decelerations. These voltage signals are applied to the multi-vibrator tubes as control biases, and are connected so that acceleration of power plant speed tends to cause an increase in propeller blade angle. These voltages are applied to the multi-vibrator grids in combination with the voltages from points 156 and 157 of bridge 137, and the algebraic sums of these two voltages are the instantaneous multivibrator bias voltages, and therefore determine the pulse ratio. The governing system so far described, effects a control of the power plant speed which is a combination of a simple $K_1$, or speed sensitive control augmented by a $K_2$, or rate sensitive control. However, the control impressed upon the lines 163 and 164 is further augmented by an automatic speed control applied through potentiometer 149, and which has been hereinbefore referred to as $K_3$ sensitivity.

$K_3$ control

The present invention contains an automatic speed control circuit which is frequency sensitive, correcting for errors in the voltage sensitive $K_1$ governor. This system referred to as $K_3$ control, being frequency sensitive, affords very precise speed control, and also permits synchronization of turbines or other power plants. This $K_3$ control is another governor system and effects its influence by modifying the $K_1$ control through adjustment of the potentiometer 149. This adjustment is made at a rate proportional to the frequency difference between the output of the alternator 15 and that of some preselected alternating frequency signal source. Figs. 4 and 5 show this automatic frequency control system as including an oscillator unit 240, a phase discriminating unit 241, and a synchronous motor 154 for adjusting potentiometer 149. This potentiometer modifies the potential appearing between the points 150 and 152 at the input of the bridge 137. The oscillator 240 is an adjustable reference frequency source which impresses the reference frequency into a discriminator 241 for comparison with the three-phase alternating signal. The output of this discriminator circuit energizes the windings 308, 309 and 310 of the three-phase synchronous motor 154 to effect adjustment of the potentiometer 149.

The oscillator 240 is a resistance-capacity tuned oscillator of conventional design. Frequency adjustment is accomplished by variation of the manual speed control potentiometer 273 incorporated in the tuned grid circuit of the first stage. The plate supply voltage of this oscillator is obtained by conductors 436 and 516 from the power supply generally indicated at 242 in Fig. 5. By proper selection of the components of the oscillator, and through adjustments of the resistors 271 and 276, a frequency range may be obtained that is identical with the frequency range of the alternator 15 when operated in the normal governing range of the power plant-propeller combination. A scheduled oscillator frequency is simultaneously set for any selected speed setting, since the frequency determining adjustment 149 is operated by shaft 155 of the manual speed control servo system. The oscillator may be synchronized with other oscillators of similar design for the purpose of synchronizing multi-power plant installations, by introducing a synchronizing signal across the resistor 281, from similar positions on similar oscillators as indicated by 406, 408 and 410 of Fig. 5.

There is a gating circuit including tube 960 in the oscillator unit 240. In this circuit, the plate load resistor 950 is connected between plate 963 and ground 255, while the cathode 961 is maintained at a negative potential by power supply 242 through lead 552. The grid 962 is coupled with the oscillator output through capacitor 914 and has its plate 963 connected over the line 438 to the grid circuits of the tubes 314, 315 and 316 of the discriminator 241, through resistors 304, 305 and 306, respectively. The discriminator tubes 314, 315 and 316 have their grids connected through a series resistor network 257, 258, 259 each to an individual phase of the alternator 15 over leads 118, 117 and 116, respectively.

The tube 960 acts as an electronic switch or gate operating at the oscillator frequency, and thereby controls conduction times of the discriminator tubes 314, 315 and 316, switching them off and on at the oscillator rate by alternately biasing all grids beyond plate current cutoff. The plates 311, 312 and 313 of the respective discriminator tubes are connected, respectively, with the angularly disposed field windings 308, 309 and 310 of the synchronous motor 154, while a common connection of the field windings is made by 518 and 516 to the positive side of the power supply 242. Each motor winding 308, 309 and 310 is shunted by a condenser 317, 318 and 319, respectively, that averages or integrates the current flowing in the respective plate circuit when the tubes 314, 315 and 316 become conductive.

The operation of the discriminator 241 is indicated by Figures 9, 10, 11 and 12 where the alternator and oscillator signals are represented for illustrative purposes only as having a square wave form. The dotted lines GP indicate ground potential, which is equivalent to cathode potential of the discriminator tubes. The alternator signal (A) is symmetrical about ground potential, swinging alternately positive (Ap) and then negative (An) with respect thereto. The oscillator signal (O) is always negative with respect to ground potential, due to the fact that on half cycles, when no current flows in gating tube 960, there is no potential drop across resistor 950, the line 438 to the discriminator grid circuits remaining at ground potential (Og) and, on the other half cycles when current flows in gating tube 960, there results a potential drop across resistor 950 that is negative, the line 438 becoming negative (On) with respect to ground.

The amplitudes of the two signals are approximately equal, but the peak voltage of the oscillator signal with respect to ground is approximately twice the peak voltage of the alternator signal with respect to ground on either half cycle and the peak values of both of these voltages on negative half cycles are in excess of the cutoff bias value of the discriminator tubes 314, 315 and 316.

Each negative half cycle of the oscillator signal (On) holds all discriminator tube plate currents cut off. Hence the gate tube 960 and its associated circuit acts as an electronic switch operating at the oscillator frequency and controlling the discriminator. The alternator signal, though mixed in the grid circuits of the discriminator, with the oscillator signal, acts as an independent grid signal.

When there is a frequency difference between the alternator signal and the oscillator signal, the relative phase angle is constantly changing and phase rotation results in a direction depending upon the sign of the difference, becoming zero where they are in phase, Fig. 9, and rotating through 180 degrees and around again through zero. The rate of phase rotation, or beat frequency, is equal to the difference in frequency between the two signals.

In Figure 9, the alternator and oscillator signal frequencies are equal and in zero phase relation with each other. Plate current (PC) is cut off for exactly 180 electrical degrees (PCo) on alternate half cycles, while both grid signals are negative on one-half cycle as at (An) and (On) and current is caused to flow on the remaining half cycles (PCf) or when the oscillator signal voltage is zero (Og) and the alternator signal voltage is positive (Ap). Plate current flows half the time and the average plate current is one-half the peak current value.

In Figure 10 the two equal signal frequencies are represented in phase quadrature, or the alternator cycles A', A'', etc., are out of phase by 90 degrees with respect to the oscillator cycles O', O'', etc., as indicated by t'. Here plate current is again cut off (PCO') during the half cycles while the oscillator signal is negative (On) and remains cut off for an additional 90° (t'') due to the presence of the negative half cycles (An) of the alternator signal and is caused to flow over the remaining 90 degrees (t''') of each cycle or while the oscillator signal is zero and the alternator signal is positive. In this case, plate current flows for only 90 electrical degrees of each cycle and the average plate current is one-fourth the peak value.

In Figure 11, the two signals (A and O) are represented in phase opposition and since one or the other of the signals (An or On) is always negative, plate current (PCo'') remains cut off during the entire cycle, and the average plate current is zero.

If the individual plate current pulses of the discriminator tubes are averaged in a circuit whose time constant is several times the period of either of the signal frequencies, this average plate current will vary with changes in the relative phase angle between the two signals. When a difference exists between the frequencies of the two signals, the resulting phase rotation at the difference frequency produces an average plate current cycling through maxima and minima at the difference frequency.

In such dynamic operation the relative phase rotation of the two signals passes through all of the static conditions illustrated in Figures 9, 10 and 11 and a sinusoidal cycling of the average plate current occurs as illustrated in Figure 12. At time T, the two grid signals A and O are in phase, as in Figure 9, and plate current is maximum; whereas at time T', the signals are 180° out of phase and plate current is minimum, as in Figure 11.

It is to be understood that, while Figure 12 is a plot of the action in one of the discriminator tubes, a similar action takes place in each of the tubes 314, 315 and 316 in Figure 5. The respective plates 311, 312 and 313 of these discriminator tubes are connected to the three phase field windings 308, 309 and 310, respectively, of a conventional three phase motor 154. The capacitors 317, 318 and 319 integrate the individual plate current pulses into three sinusoidal alternating currents flowing in these motor windings. These currents have 120 degree phase displacements due to the 120 degree phase relation of the alternator signals. The maxima of plate current flows through these motor windings are, therefore, equi-angularly disposed about the field structure of the motor, and their sequential energization produces a rotating field effecting rotation of the motor armature.

The armature shaft 446 of the motor 154 as shown in Figs. 1 and 5, is connected to the movable arm of potentiometer 149. This resistance, as previously mentioned, is a series element in the D. C. circuit of the bridge input terminals 150, 152, defined as the automatic speed control. Operation of the circuit is such that, for example, a frequency difference due to an overspeed condition increases the potential across the bridge terminals 150, 152 and thereby causes an increase in propeller blade pitch angle to reduce the speed. Thus the discriminator unit 240 electronically compares the frequency of the prime mover driven three-phase alternator 15 to that of the oscillator 240, and translates any difference in frequency due to speed error into an adjustment of potentiometer 149 in proper direction to effect a correction of the speed error.

A power supply 242 in Fig. 5 of conventional design is used to energize the oscillator, the discriminator and the motor mentioned above. This power supply may be energized from the usual aircraft or other conventional power sources. As specifically illustrated, it is energized from a transformer 245 having a primary 549 and secondary 548. This transformer also has secondaries 545, 546 and 547 to supply heater current to the terminals yy, xx and ww of the gating tube, multi-vibrator, and oscillator discriminator, sections respectively. The center tapped secondary 548 is so arranged with a rectifier-filter circuit as to produce a direct current positive potential on the conductor 516 and a direct current negative potential on the conductor 552. One of the rectifier circuits includes rectifiers 246 and 247 connected from the ends of the secondary 548 to the conductor 516, and the second rectifier circuit includes rectifiers 550 and 551 connected from the ends of the secondary 548 to the conductor 552. The voltage on the conductor 552 is negative D. C. voltage filtered by capacitor 249, resistor 912 and capacitor 913 and is used as a cathode voltage supply for the gating tube 960 in the oscillator unit 240. A D. C. positive voltage filtered by capacitor 248 is produced on the conductor 516, and is used to energize the synchronous motor 154 through a filter circuit including resistor 910 and capacitor 911. This conductor also furnishes a plate voltage for the oscillator 240 through a filter including resistor 906 and capacitor 907, and is a source of power for the solenoid valve and power amplifier circuits through a filter including resistor 908 and capacitor 909. Resistors 253 and 254 are bleeder resistors across the capacitors 248 and 249, respectively, in the D. C. power supply circuit.

Resistors 180, 181 and 182 form a network across the regulated input to the terminals 135 and 136 of the bridge to provide proper potentials for the cathode and plate circuits of the multi-vibrator section and its amplifiers. The conductor 517 furnishes positive potential from the conductor 516 to provide plate voltage for the power stage and energization for the relays 534 and 541 and the solenoid windings 62 and 63 of the control valve 14.

The several units and assemblies of the electronic governor thus powered and connected provide apparatus for speed control of the power plant load combination to maintain precise speed operation. Manipulation of the pilot's control member 9 while selecting a particular speed of operation coincidentally controls potentiometers 139 and 273 and also the hydraulic governor control 6.

A voltage is thereby set up in the circuit 138 and a reference frequency is produced in the oscillator 240 whereby the hydraulic regulator is maintained within the general propeller pitch range at which the propeller power plant combination is to operate. The bridge circuit 137 provides what we herein refer to as a $K_1$ control, by comparing a reference voltage at its terminals 135 and 136 to a speed responsive voltage provided by the circuit 138 at its terminals 150 and 152. This speed responsive voltage occurring at the terminals 150 and 152 is precisely adjusted by what is referred to as a $K_3$ control provided by the oscillator 240, discriminator 241, motor 154, and associated mechanism operating the potentiometer 149. The bridge circuit 137 therefore acts as a comparing and sensing mechanism at the same time and impresses upon the conductors 163 and 164 a control voltage that contains both the $K_1$ and $K_3$ factors mentioned above. In order to prevent hunting, the acceleration or anti-hunt circuit 412 provides an acceleration responsive voltage $K_2$ which is added algebraically to the voltage above mentioned as being impressed upon the conductors 163 and 164. We now have impressed upon the conductors 163 and 164 a multi-vibrator control voltage which combines all three of the above controls, namely, $K_1$, $K_2$ and $K_3$ controls. The multi-vibrator circuit is thereby caused to oscillate so as to provide an output pulse length ratio containing these three control factors.

The action of solenoid actuated valve 14 follows the individual multi-vibrator pulses, responding to all of the control functions applied to the conductors 163 and 164. The oscillatory movement of the solenoid valve applies pulses of hydraulic fluid to the two inlet ports of the blade servomotor of Figure 8 in the same proportion as the pulse length ratio from the multi-vibrator, and therefore, applies control forces to the chambers 51 and 52 which are the combined effects of the controls $K_1$, $K_2$ and $K_3$.

Figure 6 illustrates this pulse length ratio under conditions of on-speed, slightly off-speed, greater off-speed and far off-speed by charts A, B, C and D, respectively. Thus, under on-speed conditions, the ratio of negative pulse $a$ to positive pulse $b$ is 50-50. Under off-speed conditions, the ratio of $a'$ to $b'$ is approximately 30-70. Under larger off-speed conditions, the ratio $a''$ to $b''$ becomes 20-80. Under conditions of far off-speed, the valve is held at one extreme position or under the continued flow position $b'''$.

The valve 14 is shown in Fig. 7. It comprises a body 100 having a central bore 101 with enlargements 102 at each end. The bore 101 is fitted with a porting sleeve 103 that has control ports 55 and 56 that communicate with control passages 53 and 54 through annular channels 106 and 107, in the valve body 100. The valve body also has a passage 24 connected with an annular channel 105 and pressure supply port 104. The solenoid windings 62 and 63 are disposed each in one of the enlargements 102 and there disposed around pole pieces 108 and 109, respectively. A valve rod 110 has rigidly attached thereto core elements 60 and 61 supported centrally of supporting sleeves 113 by resilient diaphragms 111—112. The rod 110 also has formed thereon spaced lands 57 and 58, respectively, that close ports 55 and 56 to fluid flow while the valve assembly is in the central position. The whole assembly is such that in the rest position, the ports 55 and 56 are closed to fluid flow, yet electromagnetic actuation of the core members will shift the valve stem 110 so as to expose ports 55 and 56 to hydraulic pressure applied through the passage 24. For example, energization of the winding 62 will move the valve member 110 to the right so that the port 56 will be exposed to pressure and the port 55 exposed to drain. Energization of the solenoid winding 63 will cause the valve member 110 to move to the left thus exposing the port 55 to pressure and the port 56 to drain. Thus, ports 55 and 56 are connected to the blade pitch servomotor chambers 51 and 52 through lines 53 and 54 as shown in Fig. 8. In this manner the solenoid valve effects its control to the propeller blades.

The hydraulic apparatus capable of varying the propeller pitch is contained within the regulator 6, and is self-operative during propeller rotation to roughly control the propeller without any outside fluid connections. This unit is graphically illustrated in Fig. 8 of the drawings where 20 refers to a system pump driven by rotation of the propeller so as to create a source of fluid pressure in line 21. The pressure in this line is regulated by variable pressure control valve 22 and high pressure relief valve 23, so that the pressure in line 24 is always sufficient to effect any propeller pitch control called for by the governing mechanism. The line 24 connects the high pressure with a pressure reducing valve 26, the solenoid operated valve 14, and a servo actuated distributor valve 27. A low pressure line 28 extends from the pressure reducing valve 26 to a speed sensitive valve unit 29, and to a selector valve 30. As illustrated in Fig. 8, the selector valve 30 is set for governed pitch operation but may be moved by cam surface 90 either up for feathering or down for negative pitch operation. When this valve is set as illustrated for governed pitch operation, annuli or grooves 31 and 32 of a valve plunger 33 are exposed to the low pressure of the line 28, which pressure is also introduced to a groove 34 of a plunger 35 in the speed sensitive valve 29.

The speed sensitive valve 29 also includes a porting sleeve 35a embracing the valve plunger 35 and has a port 82 controlling the flow of fluid into a hydraulic line 36 leading to a groove 37 of the selector valve plunger 33. The groove 37 permits communication between the passage 36 and a branch $f$, $g$ or $n$ of a passage 38 to a large servo chamber 39 of the servo actuated distributor valve 27. The movement of a plunger 44 of this servo actuated valve is also under control of pressure introduced from a groove 32 of the valve plunger 33 through a branch $f'$, $g'$ or $n'$ of a passage 41 to a chamber 40. The chambers 39 and 40 of the servo actuated distributor valve 27 are traversed by piston members 42 and 43, respectively, which are secured to the plunger 44 having valve porting lands 45 and 46 coincident with ports 47 and 48. These last mentioned ports communicate through passages 49 and 50 with chambers 51 and 52, respectively, of a blade servomotor which controls the pitch of the propeller blade 5. The blade servomotor is also under control by the solenoid actuated valve 14 through passages 53 and 54 effected by the control circuit shown in Figs. 4 and 5 giving the $K_1$, $K_2$ and $K_3$ control mentioned above.

The control passages 49 and 50 are also connected to a pair of passages 64 and 65, respectively, which communicate with opposite sides of a shuttle valve 66 that forms part of the variable pressure control valve 22 for regulating the pressure potential of the system. As pressure is applied to either passage 49 or 50 for moving of the blades 5 of the propeller, that pressure will also be applied against one end or the other of the shuttle valve 66 to move it to a position whereby the distributed pressure may be applied also to a piston 68 in a chamber 67 of the pressure control valve 22. The opposite side 69 of the piston 68 is always subject to pressure from the pump 20 through the line 21. This piston 68 is urged radially outwardly by centrifugal force and by a spring 70 that assists the pressure in 67 and opposes the pressure in 70 so as to partially close a port 71 in response to the combined force of the fluid pressure, spring force, and centrifugal force. That meters the flow of fluid from the line 20 through the port 71 and passage 72 to a piston area 73 of the pump control valve 25. Pressure against the piston area 73 opposes centrifugal force on the plunger and tends to open a port 74 to drain. It also opens a drain port 75 for a delivery line 76 of an auxiliary pump 77 which is driven during propeller rotation. If the flow exerted against the piston area 73 is insufficient to open the relief ports 74 and 75, fluid flow from the pump 77 is delivered through the passage 76 and a ball check valve 78 to augment the flow in the main pump line 24.

The pressure reducing valve 26 is of such character that high pressure applied to a groove 79 will effect such metering action that a pressure potential of around 400 p. s. i. will be permitted to flow in the line 28 whereas as much as 500 to 3000 p. s. i. may exist in the line 24. This 400 p. s. i. pressure is communicated to the speed responsive valve 29 which is so radially disposed that the plunger element 35 will move radially outwardly (upwardly as shown in Fig. 8) under the influence of centrifugal force. The element 35 is restrained against centrifugal force by a spring biased lever 80 carried by a movable fulcrum 81 and supported by spring 82. As illustrated in Fig. 8, this apparatus is shown in the speed governed relationship under such conditions that there is no tendency on the part of the servo system to either increase or decrease the pitch of the propeller blade 5. Should there be an increase in speed over the equilibrium conditions here shown, the valve element 35 will move outwardly to uncover port 82 in the sleeve 35a to establish fluid connection between the line 28 and the passage 36 and through this passage, groove 37, and passages 38g and 38 to exert pressure on the piston head 42 in the chamber 39.

Under conditions of governed pitch operation, pressure from the line 28 is also introduced into the chamber 40 against the lower side of the piston head 43 through groove 32 and passages 41g and 41. The piston head 42 is much larger than the piston head 43 and therefore under conditions of equal pressure in the chambers 39 and 40 the valve member 44 will move downward to connect the high pressure line 24 with the control passage 50 by unmasking port 48. Hydraulic pressure from line 24 is thus introduced into the servo chamber 52 to move the blade 5 in such a direction as to increase its pitch. The increase of pitch of the propeller blade increases the load on the engine turbine or other prime mover driving the propeller and thus reduces the angular velocity of propeller rotation. The downward movement of the valve member 44 causes the relaxation of pressure on a cam member 83 allowing it to move toward the right as shown in Fig. 8, which allows the porting sleeve 35a of the valve member 29 to move upwardly thereby shifting the port 82 so that it is again masked by the valve plunger 35 to stop any further flow of the low pressure fluid to the servo chamber 39.

Should the propeller decrease in speed so that it is rotating at a speed less than that desired, then the valve plunger 35 will move inward so as to expose the port 82 to drain, thus allowing fluid flow from the servo chamber 39 through passages 38, 38g, groove 37 and conduit 36 to exhaust through port 82. Under these conditions, the low pressure in the servo chamber 40 is sufficient to raise the valve plunger 44 and thereby cause the valve land 45 to unmask the port 47. This connects the passage 49 with the high pressure hydraulic line 24 so as to subject the chamber 51 to high pressure hydraulic fluid, and causes adjustment of the propeller blade 5 in such a way as to reduce its pitch and thus permit an increase in speed. The aforementioned upward movement of the valve 44 exerts a force against the inclined surface of the cam member 83 causing it to move to the left, forcing the sleeve 35a downward to remask the port 82 by the land on the plunger 35.

The ports 84 and 85 of the valve member 27 are exhaust ports at atmospheric pressure. When the plunger 44 is moved downward so as to expose the port 48 to high pressure oil, the port 47 is simultaneously unmasked so that pressure from the chamber 51 may be exhausted through the passage 49 and port 47, to drain through port 84. Under conditions where the valve member 44 is raised so that the port 47 and chamber 51 are exposed to high pressure from the passage 24, the port 48 is simultaneously unmasked so that pressure from the chamber 52 may be exhausted through the passage 50, port 48 and port 85 to drain. The lands 45 and 46 of valve 27 are considerably wider than the ports 47 and 48 so as to bear a relation of positive overlap. The valve member 44 is thereby allowed some freedom of vertical movement without uncovering either of the ports 47 or 48. Since this vertical movement is a function of speed change, there is provided a band of speed changes over which the hydraulic regulator does not control, but which band of speed changes is automatically controlled by the solenoid actuated valve 14 in applying the $K_1$, $K_2$ and $K_3$ controls.

The speed range may be set at any desired level by the pilot upon moving the hand lever 9 (Figs. 2 and 3). On movement of this control, the cable connection 8 and linkage 7 effects the arcuate placement of the ring member 500 (Fig. 3), which by gear 502 and screw 86 adjusts the position of fulcrum 81 along the lever 80. The position of the fulcrum 81 on the lever 80 determines the spring forces applied to the valve member 35. If the pilot wishes to increase the speed setting at which the apparatus will govern, he will so actuate the lever 9 that the fulcrum 81 will be moved toward the right of the lever 80, thereby giving the spring 82 a greater advantage against centrifugal force on the valve member 35. The spring force of course must be overcome by centrifugal force to cause actuation of this valve member to a new equilibrium position. Under these conditions, the valve member 35 will reach an equilibrium position at a higher centrifugal force and therefore higher rotational speed than at its previous setting.

If the pilot wishes to reduce the rotational speed of the power plant, he manipulates the lever 9 so as to move the fulcrum 81 to the left along the lever 80 or away from the valve 35. This causes the spring 82 to have less advantage through the lever 80 on the valve member 35, which is balanced by less centrifugal force, and therefore, less rotational speed is required to reach an equilibrium position. Movement of the fulcrum 81 along the lever 80 determines the operating condition of the propeller, that is, whether feathering, governing or negative pitch. If in the governing range, this lever sets the band within which the solenoid valve 14 controls the propeller pitch. The linkage 87, 88 and 89 is actuated by 502 and screw 86 to move the fulcrum 81 and cam 90 simultaneously. If the pilot moves the lever 9 sufficiently in either direction, the pin 91 is caused to ride into either the cam branch 90f or 90n which forces the valve member 33 upwardly or downwardly, changing the connections between passages 28, 36 and 41, 38. When the linkage 89 is moved to the extreme left, the valve 33 will be moved to its extreme upward position. Under this condition, low pressure oil from the line 28 will be introduced through the groove 31, passage f and conduit 38, to the chamber 39. This opens the port 48 to high pressure from the line 24 thus driving the propeller pitch to its extreme increased pitch or feathered position. Under these conditions, the oil from the chamber 51 may exhaust through the conduit 49, port 47 and port 84, while the oil from the chamber 40 may exhaust through the conduit 41, branch f' and out the lower edge of the valve member 30.

In order to decrease the pitch of the propeller to such an extent that it goes through zero pitch to a negative pitch, and thus act as an air brake, the lever 9 is actuated so as to move the linkage 89 to the extreme right. The speed sensitive valve 29 is again cut out of the system and pressure from the line 28 is introduced through the branch $n'$ and conduit 41 to the chamber 40 of the valve 27. Oil is then exhausted from the chamber 39 of this valve through conduit 38, branch $n$ and out the upper end of the valve 30. When the piston 44 is forced to its extreme upper position, the port 47 is unmasked and oil under high pressure from the line 24 is introduced through the conduit 49 to the chamber 51, and oil is exhausted from the chamber 52 through the conduit 50 and ports 48 and 85 to drain. The propeller blade 5 is thus moved toward decrease pitch until it passes to its extreme position in the negative pitch range. As the blade 5 approaches negative pitch, it operates a cam 92 beneath the valve plunger 35 so as to shift this valve member to a position connecting the low pressure line 28 to the passage 36, in readiness for application of pressure to chamber 39 when the valve member 33 is reset in the speed governing position.

The fluid pressure supplied by the system pump 20 and the auxiliary pump 77 is normally sufficient to accomplish any desired pitch shift of the blades while the propeller is rotating. If, however, it is not sufficient, such as under conditions when the propeller has stopped rotating, an electrically driven pump 92 discharges past a check valve 93 into the passages 24a and 24. At the end of the branch 24a, there is a movable piston 94 controlling a drain port 95, and an outlet passage 96 from the pump 92 around the check valve 93. Pump 92 may be driven by any conventional motor 97. Under normal operating conditions, the pressure in the conduit 24a pushes the piston 94 upwardly against a spring 98, which connects passage 96 and the exhaust port 95 thus allowing the pump 92 to operate against zero pressure. Under conditions of low pressure in the line 24, the spring 98 will force the valve 94 into the position shown in Fig. 8, thus closing the port 95. The pump 92 then operates against the check valve 93 to force fluid into the conduit 24a and thence to the high pressure line 24 thus furnishing flow and pressure in the hydraulic control system.

During feathering or negative pitch operation, the speed responsive valve unit 29 is by-passed and the control passages 49 and 50 are so connected with the high pressure line 24 and drain line 84 or 85 that there is substantially no restriction to the flow of hydraulic fluid to the selected chamber 51 or 52 for blade actuation (chamber 52 for feathering and chamber 51 for negative pitch operation). At the same time the disconnect relay 562 for the solenoid valve is energized by operation of the switch 563, thereby disabling the effective operation of the solenoid valve.

Operation

The above described control mechanism is effective to adjust the propeller pitch under three different conditions of operation.

Under the first condition, that of feathering and of negative pitch, the valve 30 acts as a pilot valve to select feathering and negative from governed pitch range and to control the valve 27 which adjust the propeller pitch to either extreme by means of servo mechanism including the hydraulic chambers 51 and 52.

Under the second condition of operation, namely, when valve 30 is in the governing position and the controlled power plant is off-speed a large amount, the speed responsive valve 29 acts to energize the control valve 27, which in turn adjusts the propeller pitch by means of servomotor having chambers 51 or 52. Under both of these conditions of operation, the valve 27, which is of high capacity, controls the servomotor and acts as a stand-by governor to effect rate of blade angle shifts beyond the ability of valve 14.

Under the third condition of operation, namely, that of normal governing operation, more minute adjustments of the propeller pitch are made. By the positive overlap of valve 27, the lands 45 and 46 cover the ports 47 and 48, respectively, so much that the valve 27 is ineffective to control a servomotor under small off-speed conditions. The servo-mechanism is then under the sole control of the solenoid actuated valve 14. The solenoid actuated valve 14 is in the hydraulic system under all conditions of operation, but because of its smaller capacity, it is ineffective for controlling high rate pitch changes for feathering or reverse pitch control. The solenoid valve 14 is controlled by the pulses of current through its windings 62 and 63. These pulses are of lengths determined by the multi-vibrator circuit included in applicator 169. The length of the pulses produced by this multi-vibrator circuit and hence the control of the valve 14 is determined by three interacting electrical circuits. The main control of this multi-vibrator is a voltage output of the bridge circuit 137, primarily responsive to the voltage amplitude produced by the three-phase alternator 15, which is directly proportional to power plant speed and gives the $K_1$ control. The output of this bridge circuit is secondarily responsive to the speed voltage adjustment 149 that is controlled by the phase discriminator 241, and whose output is a function of the frequency difference between the frequency of the alternator 15 and a standard frequency source from electronic oscillator 240 giving the $K_3$ control. In order to overcome speed oscillatory characteristics of high inertia systems, the acceleration or anti-hunt circuit 412 provides an anticipating signal voltage which is superimposed on the voltage output of the governor bridge circuit 137 and assists in the control of the multi-vibrator 191—192 by giving the $K_2$ control. The oscillator 240 is synchronized with similar oscillators connected at 406, 408 and 410, each for one of the other power plants desired to be driven in synchronism. Thus, by these three controls suitable adjustments are made to the solenoid actuated valve 14 to accomplish precise and stable governing of a prime mover, as well as synchronous operation with similar prime movers.

The present invention is capable of modification for use as a closed circuit electro-hydraulic servo system. Such a servo system may be used as an engine control or for remote actuation of aircraft control surfaces and the like. Such a servo mechanism is shown in Figure 13. This system, as illustrated, includes a mechanically unbalanced electrical bridge 1001 giving position control ($K_1$ control) and a mechanically operated anti-hunt circuit, which together control a multivibrator oscillator 1003 which in turn energizes a solenoid actuated hydraulic valve 1005 through an amplifier 1004. The solenoid actuated valve 1005 controls the hydraulic actuating mechanism 1006 to operate a bellcrank 1040, or any other element to be controlled. The actuating mechanism 1006 has a mechanical connection through shaft 1038 to the movable arm 1016 of the bridge potentiometer 1017 and to the movable arm 1029 of the anti-hunt circuit potentiometer 1028 to form a closed servo system. Referring more particularly to Figure 13, the bridge circuit 1001 includes a D. C. power source 1008, a sensitivity control potentiometer 1012, a manually operable unbalancing potentiometer 1015, and a servo operated rebalancing potentiometer 1017. When the bridge is balanced there is no voltage appearing between the movable arms of the potentiometers 1015 and 1017. Since these arms are electrically connected to the points 1018 and 1020 through resistors 1022 and 1024, respectively, there is then no D. C. voltage at 1018, 1020 during bridge balance. When the bridge is unbalanced, there appears between points 1018 and 1020 a D. C. voltage which is proportional to the error. This D. C. voltage, impressed across the series circuit consisting of resistors 1022 to 1025, is divided into two equal D. C. voltages of opposite polarity with respect to mid-point 1021. The anti-hunt circuit includes a D. C. power source 1026, potentiometers 1028 and 1030, resistor 1036, capacitors 1032 and 1034 and resistors 1022, 1023, 1025 and 1024. The potentiometer 1028 is mechanically adjusted by the servo mechanism follow-up shaft 1038 simultaneously with the adjustment of the potentiometer 1017. The variable resistor 1030 is incorporated to control the sensitivity of the anti-hunt circuit. For a given setting of potentiometer 1030, the D. C. voltage drop that appears across the resistor 1036 is dependent upon the setting of potentiometer 1028. Under static conditions, the capacitors 1032 and 1034 block D. C. voltage from reaching the points 1018 and 1020. Under dynamic conditions, that is, when the actuator 1006 is moving the controlled element 1040, and therefore moving the potentiometer 1028, the voltage impressed across the resistor 1036 is a varying voltage. Under these conditions, the capacitors 1032 and 1034, together with serially connected resistors 1022 to 1025 inclusive, act as an electrical differentiating circuit, and anti-hunt signals appear at the points 1018 and 1020 with respect to mid-point 1021, which signals are a direct function of the rate of change of position of the actuator 1040. This circuit thereby produces rate signals which are superimposed upon the position responsive signals produced by bridge 1001 to give anti-hunt characteristics. These combined signals are applied to the grids 1042 and 1044, respectively, of the multi-vibrator tubes 1043 and 1045 whose cathodes are connected with point 1021. This multi-vibrator circuit is of conventional design except for variable symmetry as explained earlier. Voltage from the power source 1046 is impressed across the resistor network including resistors 1048, 1050 and potentiometer 1054 shunted by resistor 1052. The potentiometer 1054 has a variable tap connecting with the point 1021 for adjusting grid bias and hence the frequency of oscillation of this multi-vibrator. The output of the multi-vibrator consists of positive and negative pulses having a pulse length ratio which is a function of bridge unbalance and rate of movement of the actuator. This signal is impressed upon the grids of the amplifier tubes 1056 and 1058, respectively, to control plate current in those tubes in a ratio equal to the pulse length ratio of the output signal of the multi-vibrator. Bias for the amplifier tubes is supplied from the drop across resistor 1048. The D. C. power source 1066 furnishes voltage for the amplifier tubes and hence the power for energizing the solenoid coils 1068 and 1070 of the valve 1005. The output signal of the tube 1056 is utilized to actuate the solenoid 1068 while the output of tube 1058 is used to energize the solenoid 1070. 1072 is a source of hydraulic pressure and may be any suitable pump of conventional design. During normal operation of the device, the valve 1080 reciprocates at the multi-vibrator frequency as described earlier in connection with valve 14. When the solenoid 1070 is energized, the valve plunger 1080 moves upward and fluid under pressure enters through port 1074 and thence through the conduit 1076 into the upper chamber 1078 of the servomotor 1006. The fluid in the chamber 1082 is exhausted through the conduit 1084 to drain. When the solenoid 1068 is energized, the valve plunger 1080 moves downward, and fluid under pressure enters through the port 1074, thence through the conduit 1084 into the chamber 1082. Fluid in the chamber 1078 is exhausted through the conduit 1076 to drain. The fluid flow to the opposite sides of 1086 during the reciprocation of the valve 1080 will be in accordance with the variable symmetry of the operating multi-vibrator. The piston 1086 in either case is moved downward or upward, respectively, at a rate which at any instant depends upon the pulse length ratio of this multi-vibrator signal. As it moves it actuates shaft 1038 to move the lever 1040, the bridge potentiometer arm 1016 and the anti-hunt variable resistor arm 1029. This movement continues until the bridge 1001 is rebalanced and the bias voltages at points 1018 and 1020 disappear, the multi-vibrator symmetry is restored and valve pulsing at 50:50 is resumed.

The above invention has been described specifically as applied to certain modifications for illustrative purposes only. It is intended that the invention be construed as broad as compatible with the limitations contained in the following claims.

What is claimed is as follows:

1. In apparatus for adjusting the pitch of aircraft propeller blades the combination including; a hydraulic servomotor for adjusting the pitch of the propeller blades, a source of hydraulic pressure energized by rotation of said propeller for furnishing fluid under pressure to said servomotor, a fluid pressure controlling valve in the rotating propeller and responsive to the propeller angular velocity for governing flow of hydraulic fluid from the source to said servomotor, a solenoid actuated reciprocating fluid pressure controlling valve connected to said source and having a pair of control ports connected with opposite sides of said servomotor, means including an electronic device outside of the propeller for continuously energizing said solenoid actuated reciprocating valve whereby it effects pulse-like flow of hydraulic fluid to said servomotor, manual means operatively connected to said fluid pressure governing valve for selectively adjusting the said fluid pressure governing valve to a position for governed pitch operation, to a position for feather pitch operation and to a position for negative pitch operation, said manual means including means operatively connected to the fluid controlling valves and effective to vary the speed setting within the operating range at which the fluid controlling valves will govern the flow of hydraulic fluid to the servomotor during governed pitch operation.

2. Speed control apparatus as claimed in claim 1 in which the manual control means includes; an electric bridge, means for unbalancing said bridge, a reversible motor for adjusting the fluid pressure controlling valves and for rebalancing said electrical bridge upon energization, and a polarized relay sensitive to the direction of bridge unbalance for controlling the direction of operation of said reversible motor.

3. In an hydraulic pitch control system for variable pitch aircraft propellers, the combination including, a propeller pitch actuating servomotor, a source of hydraulic pressure energized by propeller rotation, a second source of hydraulic pressure selectively energized by an electric motor, means connecting each of said two sources of hydraulic pressure for control and actuation of the propeller pitch actuating servomotor, control means for said servomotor including, a main hydraulic pressure actuated control valve for directing the hydraulic pressure to the servomotor, a governor valve rotatable with the propeller and responsive to engine speed, said governing valve having means operatively connected therewith for roughly controlling the propeller pitch by applying hydraulic pressure to the pressure actuated control valve, said pressure actuated valve having mechanical connection to said governor valve to modify the action thereof, a solenoid operated valve for directing hydraulic pressure to said servomotor, means actuating said solenoid operated valve for precisely controlling said servomotor, said solenoid operated valve having sufficient capacity for causing minute actuation of said servomotor, and means including ports and lands of the main control valve whereby the control by the solenoid operated valve may be overridden by the control effected by the pressure actuated valve when the speed of said propeller differs from the selected propeller operation by a specified amount.

4. In a speed control apparatus as claimed in claim 3, in which a governor outside of the propeller effects operation of the solenoid actuated valve in response to error in engine speed, and to rate of change of engine speed.

5. In control apparatus for adjustable pitch propeller components, the combination including; a servomotor for adjusting the pitch of an aircraft propeller, a source of hydraulic pressure for said servomotor, a solenoid operated valve for controlling the flow of hydraulic pressure to said servomotor, a source of alternating current electrical energy the amplitude and frequency of which is directly responsive to propeller speed, means deriving a pair of parallel circuits from said source of alternating current electrical energy, an electric bridge circuit having one input from one of said derived circuits and which is proportional in voltage to the speed of the propeller, said bridge circuit having a second input from the other of said derived circuits providing a preset reference voltage, a controllable frequency electronic oscillator, a discriminator circuit having an input from the oscillator and having an output that is a function of the difference in frequency between said source of alternating current and said oscillator, means actuated by said discriminator circuit output for modifying the first mentioned input to said bridge circuit, means connecting said bridge circuit to both of said derived circuits said bridge circuit having an output voltage that varies in magnitude and polarity with the difference in potential output of said pair of derived circuits, means providing an anti-hunt circuit, the output of which is a function of the rate of change of amplitude of the alternator voltage, means providing a pulse control circuit, the output of which controls the operation of said solenoid valve, means including the output of said bridge circuit for regulating the pulse control circuit and means including said anti-hunt circuit for modifying the control of the pulse control circuit by said electrical bridge to thereby actuate said solenoid valve.

6. In speed control mechanism for prime mover variable load combinations, the improvement including; a three-phase alternator driven by said prime mover, a voltage rectifier-filter-regulator combination circuit connected with the alternator output and producing a reference D. C. voltage from one of the three alternator phases, a rectifier-filter combination circuit connected with the alternator output and producing a D. C. voltage which varies in magnitude with the angular velocity of said prime mover, an electrical bridge circuit having an input from both of said combination circuits for producing a D. C. signal that varies in amplitude and polarity with the difference in potential output of said two combination circuits, and pulse generating means controlled by the output of the said bridge circuit for adjusting said load to thereby regulate the speed of said prime mover variable load combination.

7. In a speed control mechanism as claimed in claim 6, in which the means for controlling the load includes a multi-vibrator circuit, the output of which controls the magnitude of said load and the input of which is responsive to the output of said bridge circuit.

8. In speed control mechanism as claimed in claim 6, in which means are provided for modifying the rectifier-filter combination circuit input to the bridge and include; a controllable frequency electronic oscillator, a discriminator circuit for comparing the alternator frequency and the oscillator frequency and whose output is responsive to the frequency difference between the frequency of the three-phase alternator and the frequency of said electronic oscillator, said discriminator output including means for modifying the operation of said bridge circuit to thereby promote synchronous operation between said prime mover and said electronic oscillator.

9. In a speed control mechanism as claimed in claim 6, in which anti-hunt means are responsive to variations in said one alternator phase, and means impressing the output of the anti-hunt means upon the said pulse generating means for adjusting the control by the bridge of said load to damp out over-correction.

10. In speed control apparatus for engine-propeller combinations, the combination comprising; a hydraulic servomotor for adjusting the pitch of the propeller, a source of hydraulic pressure having passage means connected to the servomotor for operating said servomotor, a solenoid actuated valve in said passage means for controlling the application of hydraulic pressure to said servomotor, precise governor means operatively connected to the solenoid valves for controlling the operation of said solenoid actuated valve, including a multi-vibrator circuit whose output operates the solenoid actuated valve, an electric bridge circuit having an output for controlling the multi-vibrator circuit, a source of alternating current electrical energy provided by propeller rotation, the amplitude and frequency of which current source is directly responsive to engine speed, means translating said electrical energy into a D. C. reference voltage, electrical transmission means connecting said reference voltage as an input to said bridge, means for translating said electrical energy into a D. C. voltage as an index of engine speed electrical transmission means connecting said index voltage as an input to said bridge, means including the electric bridge for comparing the reference voltage and the index voltage and means for applying the difference voltage of said bridge to control the multi-vibrator.

11. In speed control apparatus for engine-propeller combinations, the combination comprising; a servomotor for adjusting the pitch of the propeller; a source of hydraulic pressure for operating said servomotor; speed responsive means for controlling the application of hydraulic pressure to the servomotor for maintaining engine-propeller operation at substantially constant speed, a solenoid actuated valve controlling the application of hydraulic pressure to said servomotor for perfecting a precise adjustment in the speed of the engine-propeller combination, governing means for controlling the operation of said solenoid actuated valve and including; means producing a succession of electrical pulses for operation of the solenoid actuated valve, an electrical bridge circuit having an output for operation of the pulse producing means, a source of alternating current energy having an amplitude and frequency directly responsive to the speed of the engine-propeller combination, means producing from said alternating current energy a regulated D. C. voltage, means applying the regulated voltage to one side of the electrical bridge as a reference voltage, means producing from said alternating current energy an unregulated D. C. voltage, means applying the unregulated voltage to the opposing side of said electrical bridge as an index voltage of the current speed of the engine-propeller combination, means including said electrical bridge for comparing the index voltage with the reference voltage, means applying the voltage difference of said bridge to the pulse producing means, means for modifying the index voltage applied to the bridge responsive to a function of off-speed of the engine-propeller combination, means modifying the voltage applied to the said pulse producing means by said bridge circuit responsive to the rate of change of amplitude of said alternating current energy, and means whereby any variation in these two latter functions alters the length of the electrical pulses produced by the pulse producing means for corresponding control of the solenoid actuated valve.

12. The combination set forth in claim 11, wherein manually operated means overrides the speed responsive means to select feathered pitch operation, negative pitch operation and governed pitch operation, and to select a particular speed within the governing pitch operation, at which the speed responsive means and the solenoid actuated valve with its governing means will adjust the speed of the engine-propeller combination.

13. The combination set forth in claim 11, wherein means are provided, including the pulse producing means, for reciprocating the solenoid actuated valve during operation of the engine-propeller combination, and wherein means are provided, including the bridge circuit, for differentially varying the length of the pulses produced by the pulse producing means from pulses of equal length during on-speed operation to pulses of unequal length during off-speed operation.

14. The combination set forth in claim 11 wherein the solenoid actuated valve is a double acting valve capable of reciprocating equal distances on either side of a mid-position, and wherein the pulse producing means delivers pulses of equal length to the solenoid actuated valve during on-speed operation, and means including the bridge circuit for differentially altering the length of the pulses produced by the pulse producing means during off-speed operation.

15. The combination set forth in claim 11 wherein the solenoid actuated valve comprises a pair of opposed solenoids operable to shift the valve in opposite directions, and wherein means including the pulse producing means energizes the solenoids alternately and in rapid succession during propeller operation, said governing means including means for equalizing the length of the alternating pulses during on-speed operation and also including means for differentially varying the length of the alternating pulses during off-speed operation.

16. The combination set forth in claim 11 wherein the pulse producing means comprises a multi-vibrator having grid elements energized from the output of said electric bridge, and in which on-speed operation of said engine-propeller combination effects equal alternate pulse emanation from said multi-vibrator to operate the solenoid valve for maintaining the pitch adjustment, and in which off-speed operation of said engine-propeller combination effects unequal alternate pulse emanation from the multi-vibrator to operate the solenoid valve for correcting the pitch adjustment to overcome the speed error of the engine-propeller combination.

17. In speed control apparatus for engine-propeller combinations, the combination comprising; a double acting servomotor for adjusting the pitch of the propeller blades in a pitch increasing and a pitch decreasing direction, a source of fluid pressure having passage means connected with said servomotor for actuating the servomotor, a reciprocating valve in said passage means for alternately connecting the fluid pressure source with opposite sides of the servomotor, and precise governing means for control of the said valve, including means operatively connected to said valve for equalizing the duration of alternate connections of opposite sides of the servomotor with the fluid pressure source so that there will be no resultant adjustment of propeller pitch during on-speed operation of the engine-propeller combination, and means operatively connected to said last recited means for differentially altering the duration of alternate connections of opposite sides of the servomotor with the fluid pressure source so that there will be a resultant adjustment of propeller pitch during off-speed operation of the engine-propeller combination, and so that the resultant adjustment of propeller pitch will be in such direction as to eliminate the off-speed error.

18. In a position control apparatus for effecting precise movement of a member, a fluid pressure servomotor for reversely moving the member, a source of fluid pressure for operating the servomotor, a reciprocable valve for connecting opposite sides of the servomotor with the fluid pressure source, opposed solenoid means for reciprocating the valve, a multi-vibrator for alternately energizing the opposed solenoid means whereby the valve will be reciprocated at a selected frequency for distributing the fluid pressure to opposite sides of the servomotor by alternate fluid pulses, an electric bridge connected to the multi-vibrator and having an adjustable component for altering the symmetry of the multi-vibrator and hence the pulse ratio by which the said opposed solenoids are energized, means whereby the pulse ratio of the multi-vibrator will be in symmetry and produce equal opposite energization of the solenoids when the electric bridge is in balance, manual control means including the adjustable component of the bridge for unbalancing the bridge to differentially vary the multi-vibrator pulse ratio in accordance with the position responsive signal, and means actuated in response to movement of said member for rebalancing the electric bridge to thereby restore the multi-vibrator symmetry and restore equal pulsing of said valve.

19. The combination set forth in claim 18, wherein means providing an anti-hunt circuit is responsive to movement of said member, and acts as an electrical differentiating circuit to superimpose rate of change signal upon the position responsive signals produced by the unbalanced bridge, said rate of change signal disappearing as the bridge is rebalanced.

20. In a speed control apparatus for engine-propeller combinations, the combination comprising; a servomotor for adjusting the pitch of the propeller, a source of hydraulic pressure for operating said servomotor, a solenoid actuated valve controlling the application of hydraulic presusre to said servomotor for perfecting a precise adjustment in the speed of the engine-propeller combination, governing means for controlling the operation of said solenoid actuated valve and including means producing a succession of electrical pulses for operation of the solenoid actuated valve, an electrical bridge circuit having an output for control of the pulse producing means, means producing electrical energy as a reference voltage and applying it to one side of the electrical bridge, means producing electrical energy as an index voltage of the current speed of the engine-propeller combination and applying it to the opposite side of the electrical bridge, means including said electrical bridge for comparing the index voltage with the reference voltage and applying the voltage difference to the pulse producing means, means for modifying the index voltage applied to the bridge in response to a function of off-speed of the engine-propeller combination, means modifying the voltage applied to the said pulse producing means by said bridge circuit in response to the rate of change of the index voltage, and means whereby any variation in the two latter functions alters the length of the electrical pulses produced by the pulse producing means for corresponding control of the solenoid actuated valve.

21. In a control apparatus for engine propeller combinations having a fluid pressure system for control of the engine propeller combination at a selected regime of operation, a precise control means supplementing the fluid pressure control and including a control valve connected in the fluid pressure system and operable to adjust said combination, means for actuating the control valve comprising a pair of opposed electromagnets, a multi-vibrator having an electrical pulse output for selectively energizing the magnets, and differentially biasing means operatively connected with the multivibrator for alternately energizing the multi-vibrator to vary the pulse output thereof.

22. The combination set forth in claim 21 wherein a multi-phase alternator is driven by the engine propeller combination, means for translating one phase of the alternator output for providing a regulated D. C. reference voltage, means for translating the same phase of the alternator for providing a current D. C. voltage proportional to the speed of the combination, said differentially biasing means operating to compare said reference voltage and current voltage and operable to apply any difference voltage to the multi-vibrator.

23. In a control apparatus for engine propeller combinations having a fluid pressure system for control of the engine propeller combination at a selected regime of operation, a precise control means supplementing the fluid pressure control and including a control valve connected in the fluid pressure system for exactly adjusting the engine propeller combination, a multi-phase alternator driven by the engine propeller combination and whose output is proportional to engine speed, means producing from one of said phases a regulated D. C. voltage as a reference factor, means producing from one of said phases an unregulated D. C. voltage as a current speed factor, means comparing the reference factor and the current speed factor, differential pulsing means operated by the output of said comparing means for actuating the control valve, and means responding to equalized reference factor and current speed factor for nullifying resultant actuation of the control valve.

24. In a control apparatus for engine propeller combinations having a fluid pressure system for control of the engine propeller combination at a selected regime of operation, a precise control means supplementing the fluid pressure control and including a reversely operable solenoid actuated valve connected in said fluid pressure system and operable to adjust the engine propeller combination, means for reciprocating said solenoid actuated valve while the engine propeller combination is rotating, said means including an electronic multi-vibrator having a pulse output connected with the solenoid valve, electrical means having a differential output for energizing the multi-vibrator, voltage comparing means for effecting the differential control of the electrical means, and means including a multi-phase alternator driven by the combination for producing a regulated reference voltage and an unregulated current voltage for comparison by the voltage comparing means.

25. In control apparatus for engine propeller combinations, a self-contained fluid pressure system for control of the engine propeller combination during rotation thereof, precise control means supplementing the fluid pressure control and including a reciprocable valve in the fluid pressure system, means outside of the combination for reciprocating the valve while the combination is rotating, said outside means including a pulsing unit providing alternate pulses of electrical energy for alternately actuating said valve, an electric bridge for energizing said pulsing unit, means providing a relatively constant reference voltage applied to said bridge, means providing a current voltage proportional to speed of the combination applied to said bridge for comparison with the reference voltage, and means resultant from equalized reference voltage and current voltage for effecting equal and opposite pulsing of said pulsing unit, and means resulting from inequalities of reference voltage and current voltage for differentially operating the pulsing unit.

26. In a control apparatus for engine propeller combinations having a fluid pressure system for control of the engine propeller combination at a selected regime of operation, a precise control means supplementing the fluid pressure control and including a control valve connected in the fluid pressure system for exactly adjusting the engine propeller combination, a multi-phase alternator driven by the engine propeller combination and whose output is proportional to engine speed, means producing from one of said phases a regulated D. C. voltage as a reference factor, means producing from one of said phases an unregulated D. C. voltage as a current speed factor, means comparing the reference factor and the current speed factor, differential pulsing means operated by the output of said comparing means for actuating the control valve, and means responding to equalized reference factor and current speed factor for nullifying resultant actuation of the control valve, and means in said differential pulsing unit responding to inequalities of reference factor and current speed factor compared for differentially actuating the control valve.

27. In apparatus subject to reverse movement by control means applying fluid pressure from a source to opposite sides of a fluid pressure servo, the combination of control means for exactly positioning said apparatus including an oscillatable valve open to said source and having a pair of control ports connected each with one side of said servo, means continuously oscillating the valve for alternately opening each port to source pressure during operation of the apparatus, said valve oscillating means including a pair of opposed solenoids operable upon the valve, and an electronic device for variably energizing the solenoids, means controlling the oscillating means to effect equal and alternate fluid pressure pulses applied to opposite sides of said servo in holding the apparatus at a selected position, and means for differentially altering the length of alternating pulses applied by the oscillatable valve in moving the apparatus in either direction.

28. In apparatus subject to reverse movement by control means applying fluid pressure from a source to opposite sides of a fluid pressure servo, the combination of control means for exactly positioning said apparatus including an oscillatable valve open to said source and having a pair of control ports connected each with one side of said servo, means continuously oscillating the valve for alternately opening each port to source pressure during operation of the apparatus, said valve oscillating means including a pair of opposed solenoids operable upon said valve, a multivibrator whose output alternately energizes a solenoid and an electric bridge circuit for controlling the firing of said multi-vibrator, means controlling the oscillating means to effect equal and alternate fluid pressure pulses applied to opposite sides of said servo in holding the apparatus at a selected position, and means for differentially altering the length of alternating pulses applied by the oscillatable valve in moving the apparatus in either direction.

29. In apparatus subject to reverse movement by control means applying fluid pressure from a source to opposite sides of a fluid pressure servo, the combination of control means for exactly positioning said apparatus including an oscillatable valve open to said source and having a pair of control ports connected each with one side of said servo, means continuously oscillating the valve for alternately opening each port to source pressure during operation of the apparatus, said valve oscillating means including a pair of opposed solenoids operable upon said valve, and a multivibrator whose plate circuit alternately energizes a solenoid, means controlling the oscillating means to effect equal and alternate fluid pressure pulses applied to opposite sides of said servo in holding the apparatus at a selected position, said oscillation controlling means comprising an electric bridge whose output effects the firing of the multivibrator, a source of alternating current, means deriving from said current source a reference D. C. voltage and applying that voltage to one side of the bridge, means deriving from said alternating current an index D. C. voltage proportional to misposition of said apparatus and applying that voltage to the opposite side of the bridge for comparison with the reference voltage, and means applying the balanced and unbalanced output of the bridge to the control of the multivibrator in effecting the equal and differential pulse ratio respectively of the oscillating valve, and means for differentially altering the length of alternating pulses applied by the oscillatable valve in moving the apparatus in either direction.

ALBERT P. DINSMORE.
ROBERT C. TRESEDER.
JAMES W. LIGHT.
HOWARD M. GEYER.
JOSEPH C. WHITMER.

References Cited in the file of this patent

UNITED STATES PATENTS

| Number | Name | Date |
|---|---|---|
| 1,151,522 | Hodgkinson | Aug. 24, 1915 |
| 1,485,865 | Meyer | Mar. 4, 1924 |
| 2,363,670 | Hoover | Nov. 28, 1944 |
| 2,382,847 | Bauman | Aug. 14, 1945 |
| 2,410,659 | Hoover | Nov. 5, 1946 |
| 2,455,315 | Rose | Nov. 30, 1948 |
| 2,517,703 | Offner | Aug. 8, 1950 |